United States Patent  (10) Patent No.: US 6,389,503 B1
Georgis et al.  (45) Date of Patent: *May 14, 2002

(54) TAPE DRIVE EMULATION BY REMOVABLE DISK DRIVE AND MEDIA FORMATTED THEREFOR

(75) Inventors: Steve Georgis, Boulder; Lawrence A. Freymuth, Longmont, both of CO (US)

(73) Assignee: Exabyte Corporation, Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/045,691

(22) Filed: Mar. 23, 1998

Related U.S. Application Data

(63) Continuation-in-part of application No. 08/905,326, filed on Aug. 4, 1997.

(51) Int. Cl.⁷ .............................................. G06F 12/00
(52) U.S. Cl. .................. 711/4; 714/6; 369/32
(58) Field of Search .......................... 395/500; 369/84, 369/59, 32; 711/118, 4; 360/15, 61; 714/6, 758

(56) References Cited

U.S. PATENT DOCUMENTS

| | | | |
|---|---|---|---|
| 3,955,180 A | 5/1976 | Hirtle | |
| 4,511,963 A | 4/1985 | Kantner | |
| 4,727,512 A | 2/1988 | Birkner et al. | |
| 4,775,969 A | * 10/1988 | Osterlund | 369/53 |
| 4,947,367 A | 8/1990 | Chang et al. | |
| 5,111,463 A | 5/1992 | Zook | |
| 5,220,569 A | * 6/1993 | Hartness | 714/758 |
| 5,297,124 A | * 3/1994 | Plotkin et al. | 369/32 |
| 5,301,304 A | 4/1994 | Menon | |
| 5,438,674 A | * 8/1995 | Keele et al. | 711/4 |
| 5,455,814 A | * 10/1995 | Sako | 369/59 |
| 5,455,926 A | 10/1995 | Keele et al. | |
| 5,642,497 A | 6/1997 | Crary et al. | |
| 5,719,885 A | * 2/1998 | Ofer et al. | 714/6 |

* cited by examiner

*Primary Examiner*—Do Hyun Yoo
*Assistant Examiner*—Mehdi Namazi
(74) *Attorney, Agent, or Firm*—Nixon & Vanderhye P.C.

(57) ABSTRACT

A disk drive detects whether a disk inserted therein has a frame-based enhanced formatting. Disks having the frame-based enhanced formatting are readable by enhanced drives, e.g., those with the tape drive emulators. The frame-based enhanced formatting imposes on the data (1) an data organization, imperceptible to disk drive 22, for rendering the data expressible and locatable in a tape drive format, and (2) an additional degree of error correction that provides enhanced data integrity necessary for data backup/restore operations. The detection stems from a secondary formatting operation of the invention in which a format type identification is recorded on the disk. Preferably, the format type identification is recorded as one disk sector at a beginning logical block address of the disk, and forms part of a volume header frame. The volume header frame is followed by a directory comprising one or more directory frames.

69 Claims, 27 Drawing Sheets

| FIG. 12A |
|---|
| FIG. 12B |

TAPE DRIVE EMULATION BY REMOVABLE DISK DRIVE AND MEDIA FORMATTED THEREFOR

This is continuation-in-part of U.S. patent application Ser. No. 08/905,326 filed Aug. 4, 1997 and entitled "TAPE DRIVE EMULATOR WITH REMOVABLE DISK DEVICE", which is incorporated herein by reference

BACKGROUND

1. Field of the Invention

This invention pertains to the storage or backup of data on rotating media, and particularly to storage of data using a removable disk drive.

2. Related Art and Other Considerations

Data, such as computer-generated data, is typically stored on a backup media for e.g., security and archival purposes. In view of reliability and affordability, magnetic tape has traditionally been a preferred media for data backup and restoration. Numerous types of magnetic tape drives are currently marketed, including helical scan tape drives and serpentine-type tape drives.

Another type of storage media is the rotating disk. Rotating disk media can be either magnetic or optical. Magnetic disks are traditionally classified as either floppy disks or hard disks. Both floppy and hard disks are handled by respective types of disk drives. Of the two types, the hard disk is normally employed for on-line data storage and has a significantly greater storage capacity. Moreover, in contrast to floppy disks, historically hard disks have been essentially permanently housed in the drive and removable or manipulated only by a technician.

In recent years removable disk drives have become available. A removable disk drive is a variation of the hard disk drive which allows a disk cartridge to be removed from the drive. Like the conventional hard disk, the disk of the removable disk drive is preformatted, as explained below.

Disk drives, both magnetic and optical, employ a format which divides the data into fixed-sized sectors. In a magnetic disk drive, typically a sector has either 512 or 1024 bytes of user data. Each sector is a self-contained unit that includes, along with the user data, certain control information such as synchronization marks, headers, cyclical redundancy check (CRC) characters, and error correction characters (ECC). Consequentially, the error correction characters (ECC) information contained on a disk is useful only for correcting errors within the sector in which it is stored. Such disk ECC information covers only the user data and the header of the sector. Other control information in the sector is not protected. If errors occur at locations which corrupt the control information, it is possible that the entire sector may not be readable. In other words, the disk ECC is to no avail for correcting information such as control information on disk.

In a normal hard disk drive the disk is sealed. Because of the particular manufacturing process for hard disks, defects on the disk which might cause errors are typically not a significant problem. In particular, in the manufacturing process for a hard disk, the disk manufacturer checks each sector and determines which sectors may be defective. If a sector is deemed defective, the sector is noted on a defect list for the disk. Sectors on the defect list are not available for recording data, i.e., remain unused. Then, after the disk is sealed in the disk drive, new defects on the disk are not introduced. The disk drive ECC thus can be minimal, and is designed only to correct small intermittent errors which can occur due to electromagnetic interference, radio frequency interference, environmental drift, and the like.

As mentioned above, in a removable disk drive the media is not sealed. Rather, the media is enclosed in a cartridge of some type, but the cartridge must be opened by the drive in order for heads of the drive to access the media. The process of opening and closing the disk cartridge can allow contaminates to enter the media and create new defects. In this case, the conventional drive ECC is insufficient to guarantee reliability of the data recorded on the removable disk.

Removable disk drives have numerous features appropriate for operations such as data backup and restore. Such features include long life, relative immunity to environmental limitations, high data rates, random access to data, and simple drive mechanisms. In addition, removable disk drives may ultimately be economically reasonable alternatives to other magnetic media. However, unless overcome, the inability to provide sufficient data integrity would jeopardize the usefulness of removable tape drives from integrity premium operations such as data back up and restore.

What is needed, therefore, and an object of the present invention, is method and apparatus for enhancing data integrity for removable disk drives.

SUMMARY

A tape drive emulator is between a host computer and a removable disk drive and appears to the host computer as a sequential storage system, e.g., a tape drive. However, the tape drive emulator processes the data obtained from or applied to the host computer so that the data can be communicated to the removable disk drive in a manner compatible with a conventional removable disk drive. Yet in so doing, the tape drive emulator imposes on the data (1) a data organization, imperceptible to the disk drive, for rendering the data expressable and locatable in a tape drive format, and (2) an additional degree of error correction that provides enhanced data integrity necessary for data backup/restore operations.

In a recording operation, the tape drive emulator, in response to tape drive-based commands from the host computer, prepares a set of data for recording in a predetermined plural number of sectors on the disk, the set of data having set error correction bytes generated over the set, the error correction bytes being sufficient to recover one or more sectors of the disk not readable by the disk drive. Each set of data comprises a predetermined number of units.

In a first mode of the invention, a set of data is a frame comprising forty units, each unit being a disk sector. Each frame has packed and compressed logical blocks of data, along with sectors of ECC bytes generated over the frame. In addition, each frame has header bytes and CRC bytes. The frame error correction bytes of the first mode facilitate recovery of one or two unreadable sectors of a frame obtained from the disk. For example, if one or two sectors comprising a frame are unreadable from the disk, the frame error correction bytes enable the tape drive emulator to recover the lost sector(s), thereby providing a higher degree of data quality integrity.

In a second mode of the invention, a set of data is a super frame comprising forty units, each unit being akin to the forty-sector frame of the first embodiment. A super frame has a first predetermined number of user data frames and a second predetermined number of ECC frames. The ECC frames include ECC bytes generated over the entire super frame. A greater number of unreadable sectors are potentially recoverable using the second mode of the invention.

The present invention also includes a method for enabling a disk drive to detect whether a disk inserted therein has the set-based enhanced formatting of the present invention. Disks having the multi-sectored setbased enhanced formatting of the present invention are readable by enhanced drives, e.g., those with the tape drive emulator of the invention.

The detection method stems from a secondary formatting operation of the invention. In accordance with the secondary formatting operation, a format type identification is recorded on the disk. The format type identification is interpretable by an enhanced drive as indicating that the disk is compatible with transducing a multi-sectored set of data. Preferably, the format type identification is recorded as one disk sector at a beginning logical block address of the disk, and forms part of a volume header frame. The volume header frame is followed by a directory comprising one or more directory frames.

A frame can be one of several frame types, including a volume header frame, a data frame, an ECC frame (for the super frame mode), or a directory frame. A volume header frame includes volume identification information and a partition table. Part of the volume identification information is a volume format ID field (e.g., format type identification) which identifies the disk as having been formatted for use with the present invention. Directory frames are employed to compose a directory on the disk, e.g., at the beginning of the disk. The directory includes a frame index entry for each data frame recorded on the disk. The frame index entries enable the tape drive emulator to locate certain tape drive-related delimiters on the disk, such as logical block number, file marks, and set marks.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
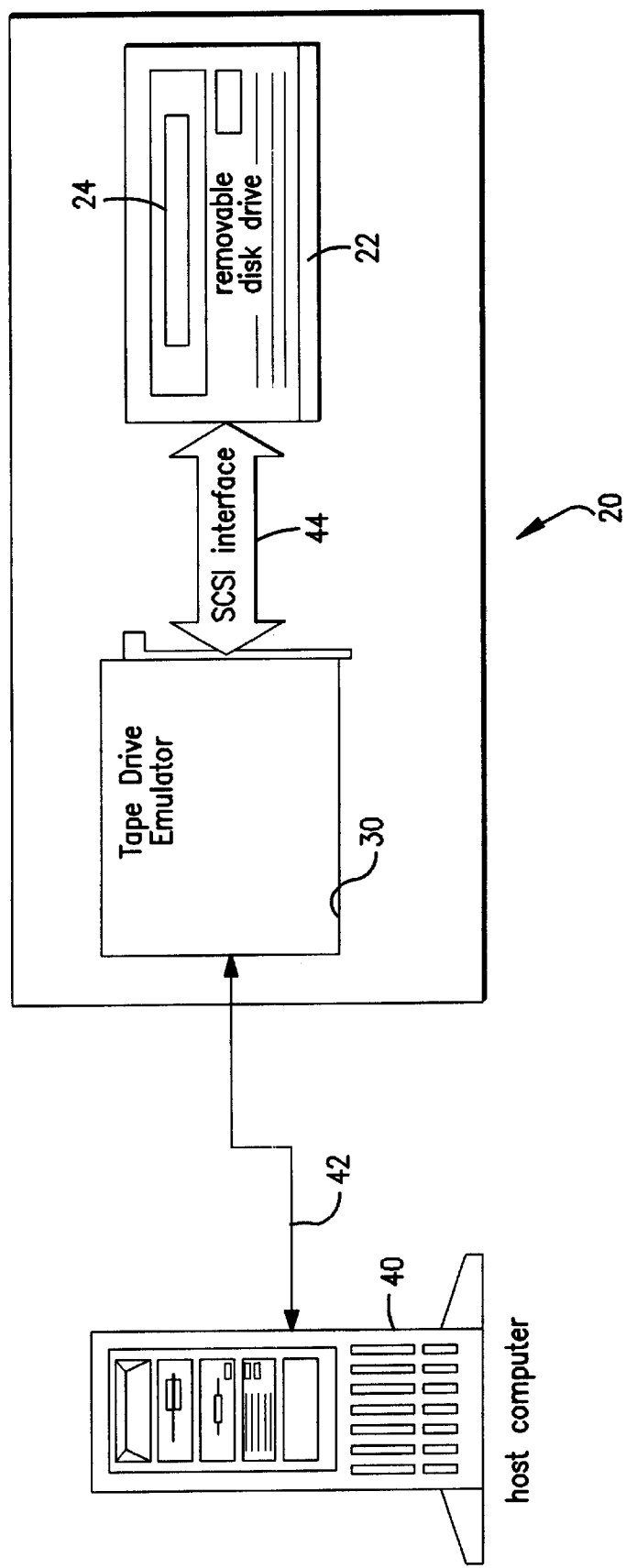
FIG. 1 is a schematic view of a data storage system according to an embodiment of the present invention.

FIG. 1 shows a data storage system 20 according to an embodiment of the invention. Data storage system 20 includes a standard removable disk drive 22 which handles a rotating magnetic disk 24, as well as tape drive emulator 30. In handling disk 24, disk drive 22 employs transducing elements or heads and suitable electronics in order to transduce (i.e., record or playback) information in sector format on disk 24. The information recorded on disk 24 during recording or writing is ultimately obtained from host computer 40 in connection with, for example, a backup operation for storing computer data from host computer 40 on disk 24. Conversely, information obtained from disk 24 during playback or reading is ultimately applied to host computer 40 as can occur in a data restore operation, for example.

In accordance with the present invention, tape drive emulator 30 is connected to host computer 40 and appears to host computer 40 as a sequential storage system, e.g., a tape drive. In this regard, cable 42 connecting host computer 40 with tape drive emulator 30 carries data and signals including commands for a tape drive. However, tape drive emulator 30 processes the data obtained from or applied to host computer 40 so that the data can be communicated to removable disk drive 22 over SCSI interface cable 44 in a manner compatible with a conventional removable disk drive. Yet in so doing, tape drive emulator 30 imposes on the data (1) a data organization, imperceptible to disk drive 22, for rendering the data expressible and locatable in a tape drive format, and (2) an additional degree of error correction that provides enhanced data integrity necessary for data backup/restore operations.

Figure 1A:
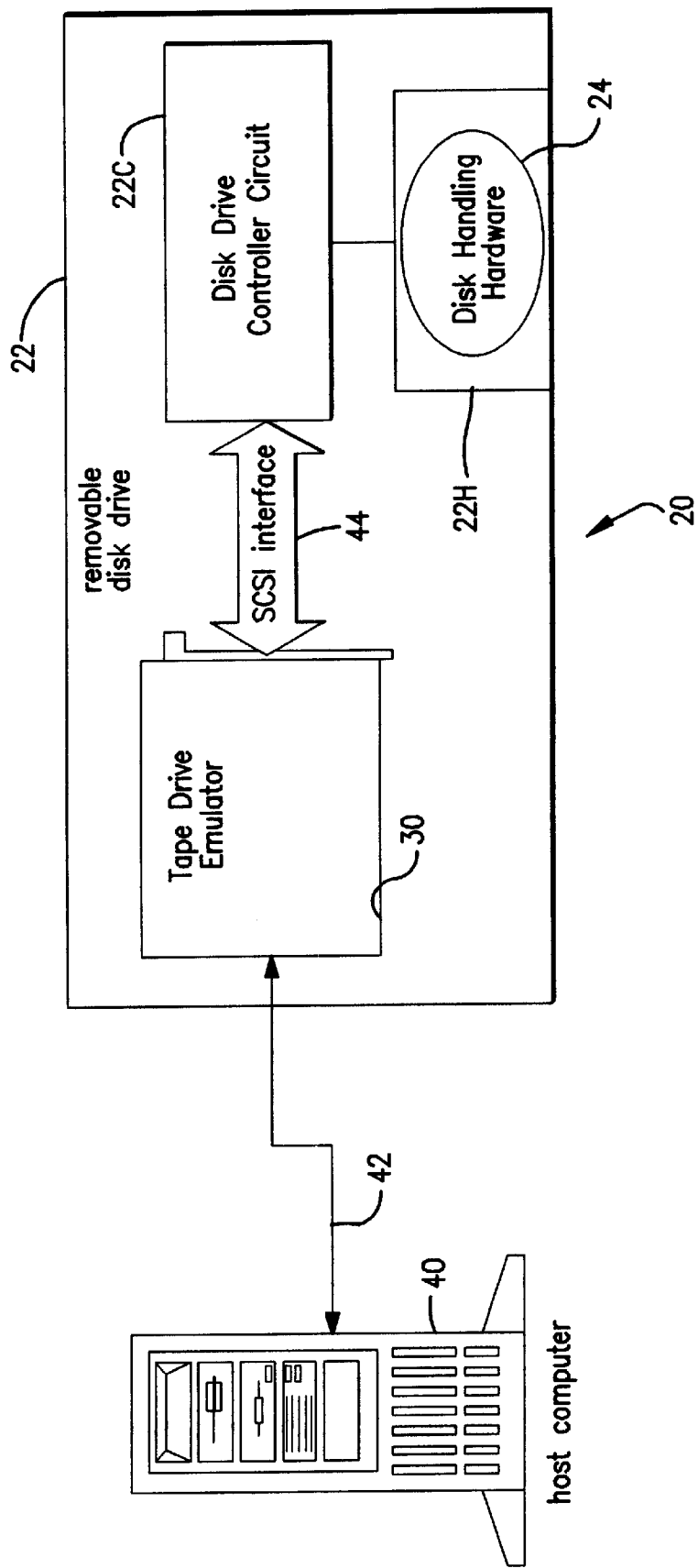
FIG. 1A is a schematic view illustrating that a tape drive emulator of the data storage system of FIG. 1 may be accommodated within the housing of a disk drive.
Figure 1B:
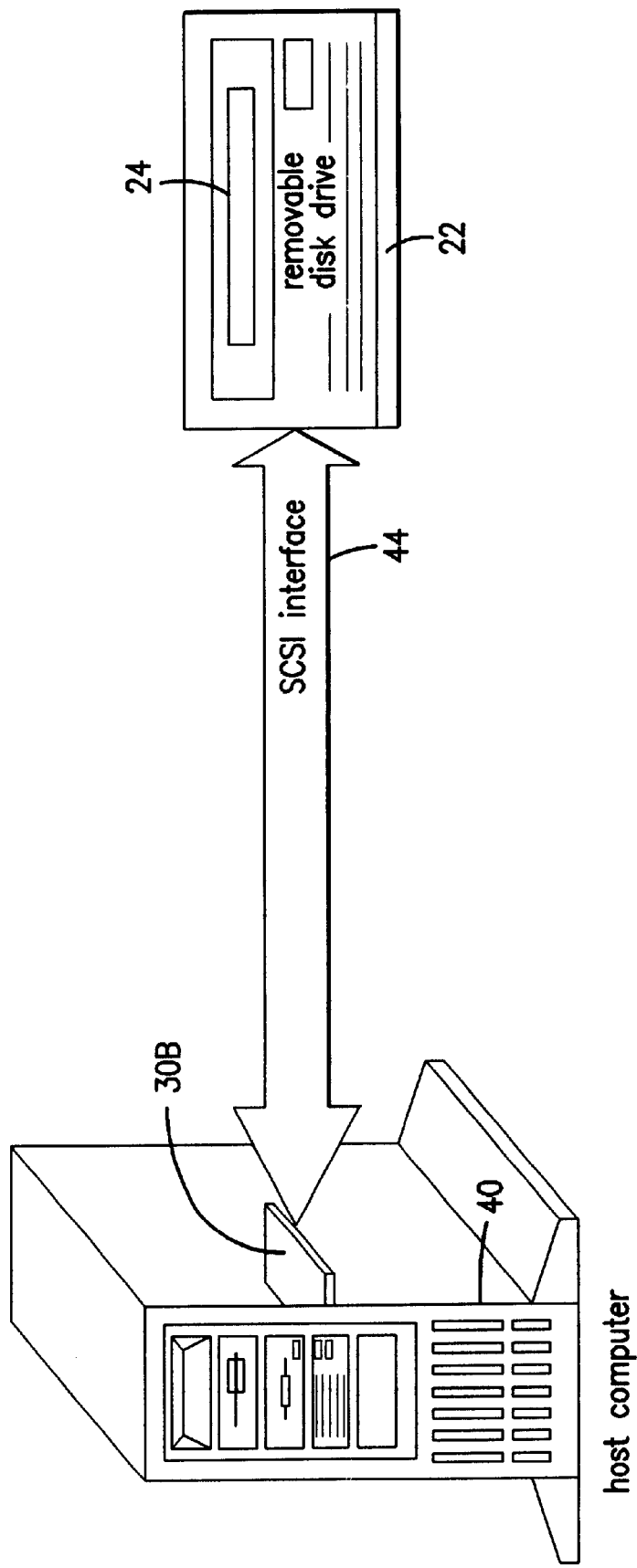
FIG. 1B is a schematic view illustrating that a tape drive emulator included in a data storage system of the present invention may be accommodated at a host computer.

It should be understood that data storage system 20 including tape drive emulator 30 can be situated within a housing of removable disk drive 22. FIG. 1A provides an illustration of such an arrangement, in which the housing of removable disk drive 22 (represented by the encompassing rectangle) accommodates not only disk drive controller circuit 22C and disk handling hardware 24 as typically occurs within a disk drive, but also tape drive emulator 30. Within the housing of removable disk drive 22 SCSI interface cable 44 connects disk drive controller circuit 22C to tape drive emulator 30. As shown in FIG. 1A, tape drive emulator 30 can reside on an appropriate circuit card, for example. Alternately, of course, tape drive emulator 30 can be situated externally of the housing of removable disk drive 22. In fact, as shown in FIG. 1B, the tape drive emulator can even be accommodated at host computer 40. FIG. 1B shows the tape drive emulator being embodiment on a printed circuit board 30B in host computer 40. Moreover, it should be understood that the functions performed by tape drive emulator 30 of the present invention can be performed by a software program of coded instructions executable on a processor (e.g., CPU) of host computer 40.

Figure 2:
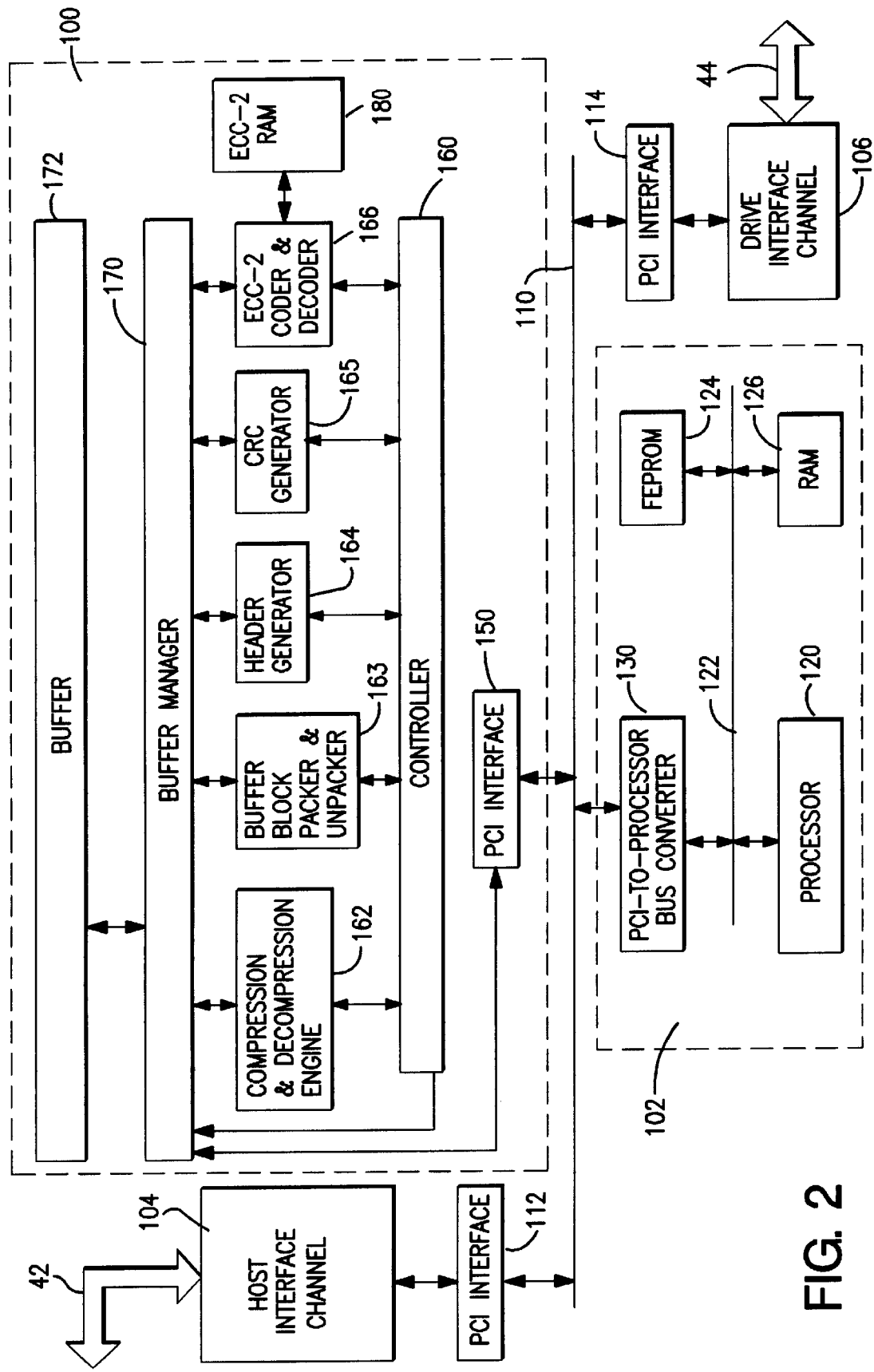
FIG. 2 is a schematic view of a tape drive emulator included in the data storage system of FIG. 1.

FIG. 2 shows tape drive emulator 30 as comprising data formatter/deformatter 100 and a processor section 102. In addition, tape drive emulator 30 has a host interface channel 104 and drive interface channel 106. Formatter/deformatter 100, processor section 102, host interface channel 104, and drive interface channel 106 communicate over a PCI bus 110. PCI interfaces 112 and 114 are provided for connecting respective host interface channel 104 and drive interface channel 106 to PCI bus 110.

Host interface channel 104 and drive interface channel 106 are constituted by suitable circuitry for processing signals and passing through data received from or applied to host computer 40 and disk drive 22, respectively. Drive interface channel 106 is preferably a SCSI port which connects by cable 44 to disk drive 22. Similarly, host interface channel 104 is also preferably a SCSI port, but depending on the nature of cable 42 can also be an optical fiber-handling or other type channel, including an RF or IF channel.

Processor section 102 includes a microprocessor 120 which communicates over processor bus 122 to various memory elements including FEPROM 124 and RAM 126. Processor bus 122 is also connected to a PCI-to-processor bus converter 130 which serves to interface and processor bus 122 with PCI bus 110.

Formatter/deformatter 100 connects to PCI bus 110 through PCI interface 150. Formatter/deformatter 100 comprises a controller 160 which supervises, coordinates, and sequences operation of various engines or units, including compression and decompression engine 162, buffer block packer and unpacker 163; header generator 164; CRC generator 165; and ECC encoder and decoder 166. ECC encoder and decoder 166 handles frame ECC bytes [depicted in the drawings as ECC-2], a layer of error correction which is above and beyond conventional disk drive ECC. In addition to the foregoing, formatter/deformatter 100 includes a buffer manager 170 which is utilized by controller 160 and these engines and units for storing and retrieving data with respect to buffer 172. Buffer 172 is a suitable memory chip, such as a RAM, in which data is stored in accordance with an organization formulated by buffer manager 170 in the manner hereinafter described e.g., with reference to FIG. 6. Another memory, particularly ECC RAM 180, is also provided in formatter/deformatter 100, but is accessible by ECC encoder and decoder 166 for purposes of e.g., intermediate storage error correction bytes, syndromes and the like generated by ECC encoder and decoder 166.

Modes of operation of the invention which can be implemented on the above-described structure are detailed hereinafter. Common to all modes is the fact that tape drive emulator 30 has a multi-sectored set-based enhanced formatting in which it prepares a set of data for recording in a predetermined plural number of sectors on the disk. The set of data has set error correction bytes generated over the set, the error correction bytes being sufficient to recover a sector of the disk not readable by the disk drive. Each set of data comprises a predetermined number of units. In a first mode of the invention, a set of data is a frame comprising forty units, each unit being a disk sector. Each frame has packed and compressed logical blocks of data, along with sectors of ECC bytes generated over the frame. In addition, each frame has header bytes and CRC bytes. In a second mode of the invention, a set of data is a super frame comprising forty units, each unit being akin to the forty-sector frame of the first embodiment. A super frame has a first predetermined number of user data frames and a second predetermined number of ECC frames. The ECC frames include ECC bytes generated over the entire super frame.

Figure 3:
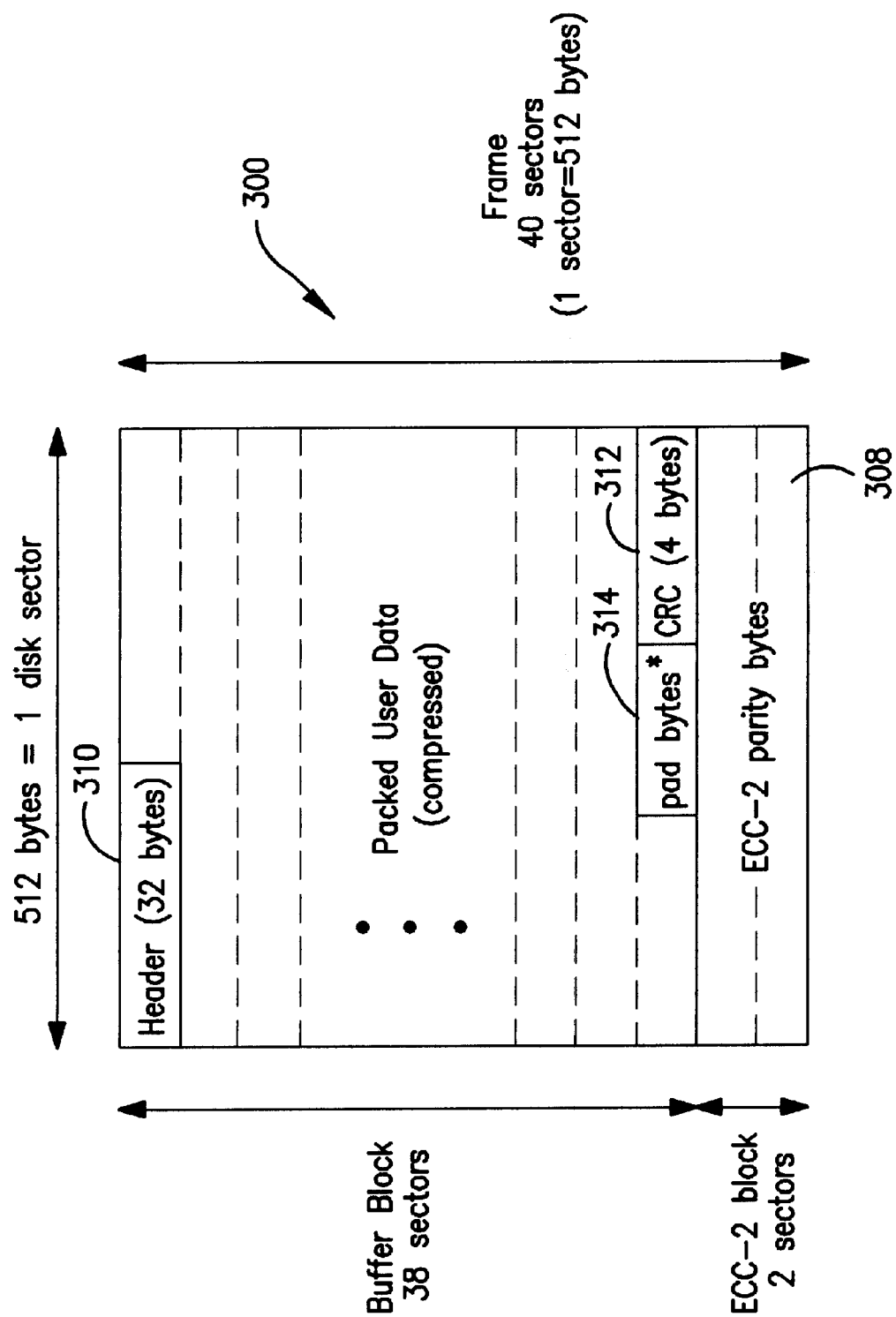
FIG. 3 is a diagrammatic view of an embodiment of a frame utilized in the data storage system of FIG. 1.

Assuming that disk 24 is formatted to have sectors of 512 bytes each, FIG. 3 shows a transparent organization imposed by formatter/deformatter 100 of tape drive emulator 30 on the data stored on disk 24 in accordance with the first mode or "frame" mode of the invention. In particular, the data stored on disk 24 is organized frames, one such frame 300 being shown in FIG. 3. Each frame 300 is to be laid down on disk 24 in a data area of forty conventional disk sectors, the sectors being delineated for sake of illustration as horizontal lines (either solid or broken) in FIG. 3. The portion of frame 300 included in the data area of the first thirty eight sectors are referenced herein as a "buffer block", while the data area of the last two sectors occupied by each frame 300 include the frame ECC bytes 308, or the enhanced or second tier ECC bytes. The first thirty two bytes of the data area of the first sector of frame 300 serve as a frame header 310. The last four bytes of the data area of the thirty eighth sector serve as buffer block CRC bytes 312. Compressed and packed user data lies between frame header 310 and buffer block CRC bytes 312. Pad bytes (indicated by reference numeral 314) are employed as necessary to fill in the user data area between frame header 310 and buffer block CRC bytes 312.

In accordance with the present invention, frames such as frame 300 can serve various purposes. Perhaps the most common employment of the frame is for actual user data. However, other types of frames such as the directory frame and the volume header frame are also utilized. Directory frames contain index information as described in more detail in connection with FIG. 13, FIG. 14, and FIG. 15. The volume header frame includes e.g., volume identification information as hereinafter described with respect to FIG. 14A. In addition, in the second mode of the invention, ECC frames are also provided (see FIG. 20B).

While FIG. 3 shows a particular organization in which forty sectors on the disk are utilized to form frame 300, it should be understood that frame size can vary in other embodiments. Any embodiments having it variants in frame size should assure sufficient frame error correction in accordance with the frame size.

Figure 4:
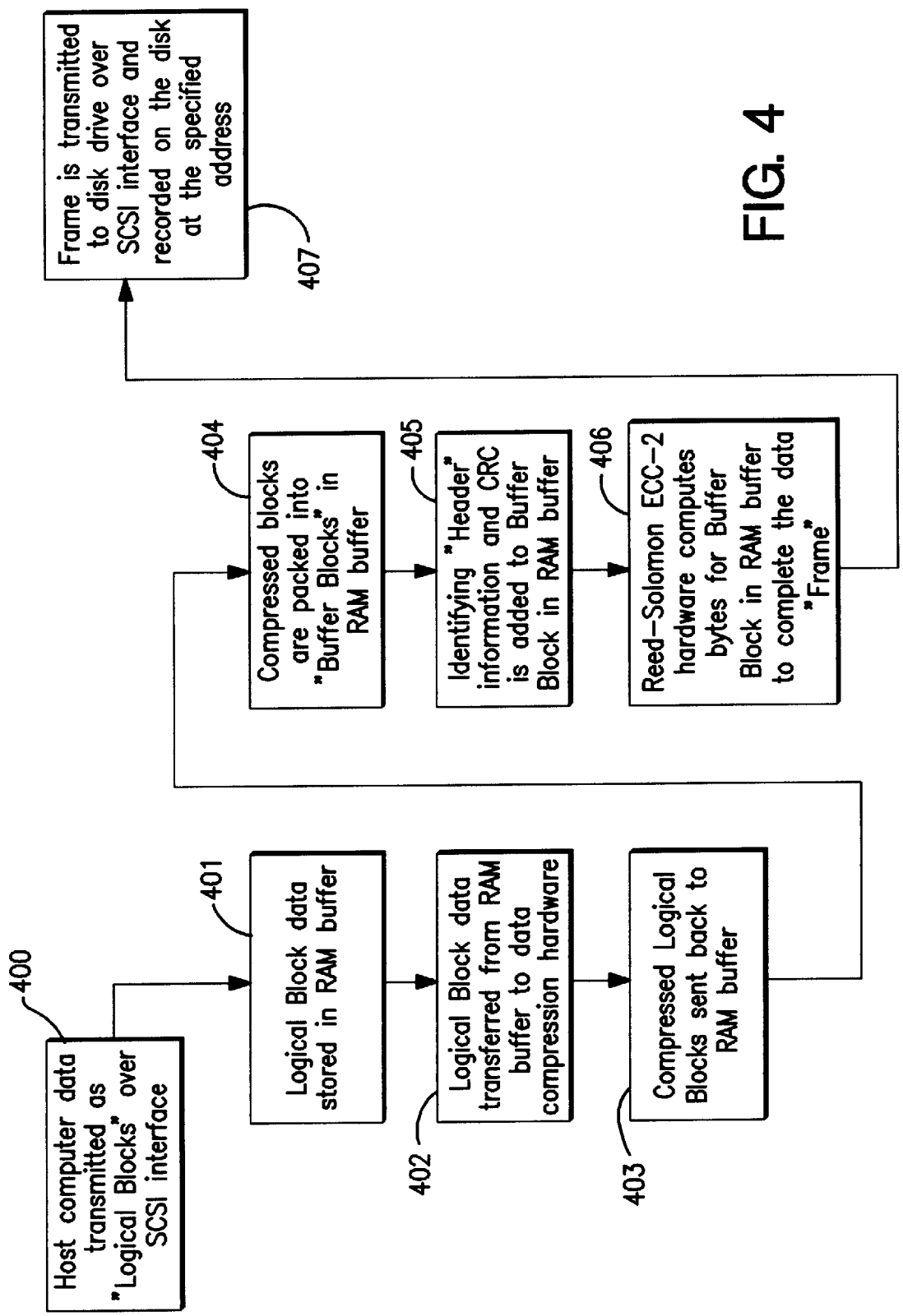
FIG. 4 is a flowchart generally showing steps involved in a recording process using the data storage system of FIG. 1.

FIG. 4 shows basic steps depicted in a recording or write process in which user data from host computer 40 is recorded on disk 24. As indicated by step 400, host computer 40 transmits logical blocks of user data over cable 42 for reception at host interface channel 104 (see FIG. 2). At an appropriate time, the logical blocks are transmitted over PCI bus 110 to formatter/deformatter 100 and are stored, under control of buffer manager 170, in appropriate memory locations in buffer 172 (step 401).

Figure 6:
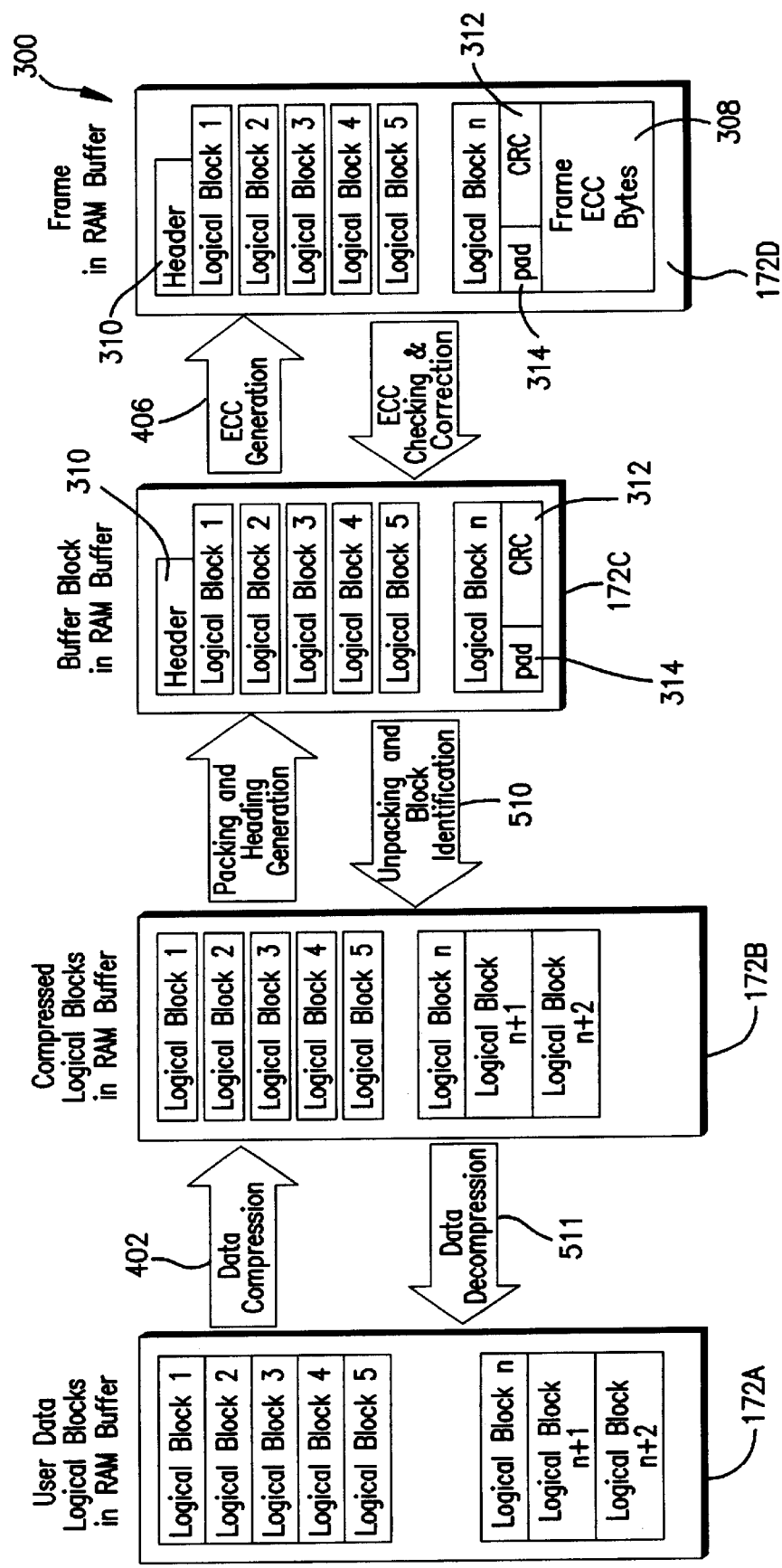
FIG. 6 is a diagrammatic view showing a flow of data from logical blocks to frames in the data storage system of FIG. 1.

Step 402 shows the logical blocks stored in buffer 172 being transferred, via buffer manager 170, to compression and decompression engine 162. Engine 162 compresses the logical block using any one of several conventional data compression techniques, and then (via buffer manager 170) returns the logical blocks to buffer 172 as indicated by step 403. FIG. 6 shows an illustrative section 172A of buffer 172 in which logical blocks obtained from host computer 40 are stored in accordance with step 401. Section 172B of buffer 172 as depicted in FIG. 6 shows compression of logical blocks after the compression of step 402.

At step 404, a set of compressed logical blocks are packed into a buffer block. As mentioned before, in the first mode a buffer block will be laid down in the data area of the first thirty eight sectors of a forty sector frame 300 (see FIG. 3). For the packing operation, a memory location such as section 172B is transmitted via buffer manager 170 to buffer block packer and unpacker 163 (see FIG. 2) for generation of a buffer block. After packing, the packed buffer block is returned to buffer 172.

Step 405 involves generation of both frame header 310 and buffer block CRC bytes 312 (see FIG. 3) for the buffer block. Frame header 310 and buffer block CRC bytes 312 are generated by header generator 164 and CRC generator 165, respectively, under supervision of controller 160 in a manner understood by those skilled in the art. Fame header 310 includes control and identification information which conveys frame sequence number, frame type, control flags related to the packing of logical blocks in the frame, logical block count, file mark count, setmark count, and partition number.

FIG. 6 shows as section 172C the contents of a buffer block upon insertion therein of frame header 310 and buffer block CRC bytes 312 upon completion of steps 405, as well as insertion of pad bytes 314. Pad bytes 314 can be generated by a separate unillustrated pad byte generator, or alternatively by other elements such as controller 160.

Step 406 shows that the buffer block is transmitted to ECC encoder and decoder 166 whereat the buffer block is utilized to generate frame ECC bytes over the entire buffer block. As shown in FIG. 3, upon return of the buffer block and frame ECC bytes to buffer 172, a frame 300 is formed as shown in section 172D of FIG. 6. As mentioned previously, in the first mode of the invention the frame ECC bytes 308 ultimately comprise two sectors of frame 300.

Step 407 shows the frame being transmitted from buffer 172 to removable disk drive 22, as well as recording by disk drive 22 in accordance with its conventional operation on disk 24. The transmission involves retrieval of the frame from buffer 172 by buffer manager 170 and application of the frame to PCI bus 110 (via PCI interface 150) and then to drive interface 106 and cable 44.

Figure 7:
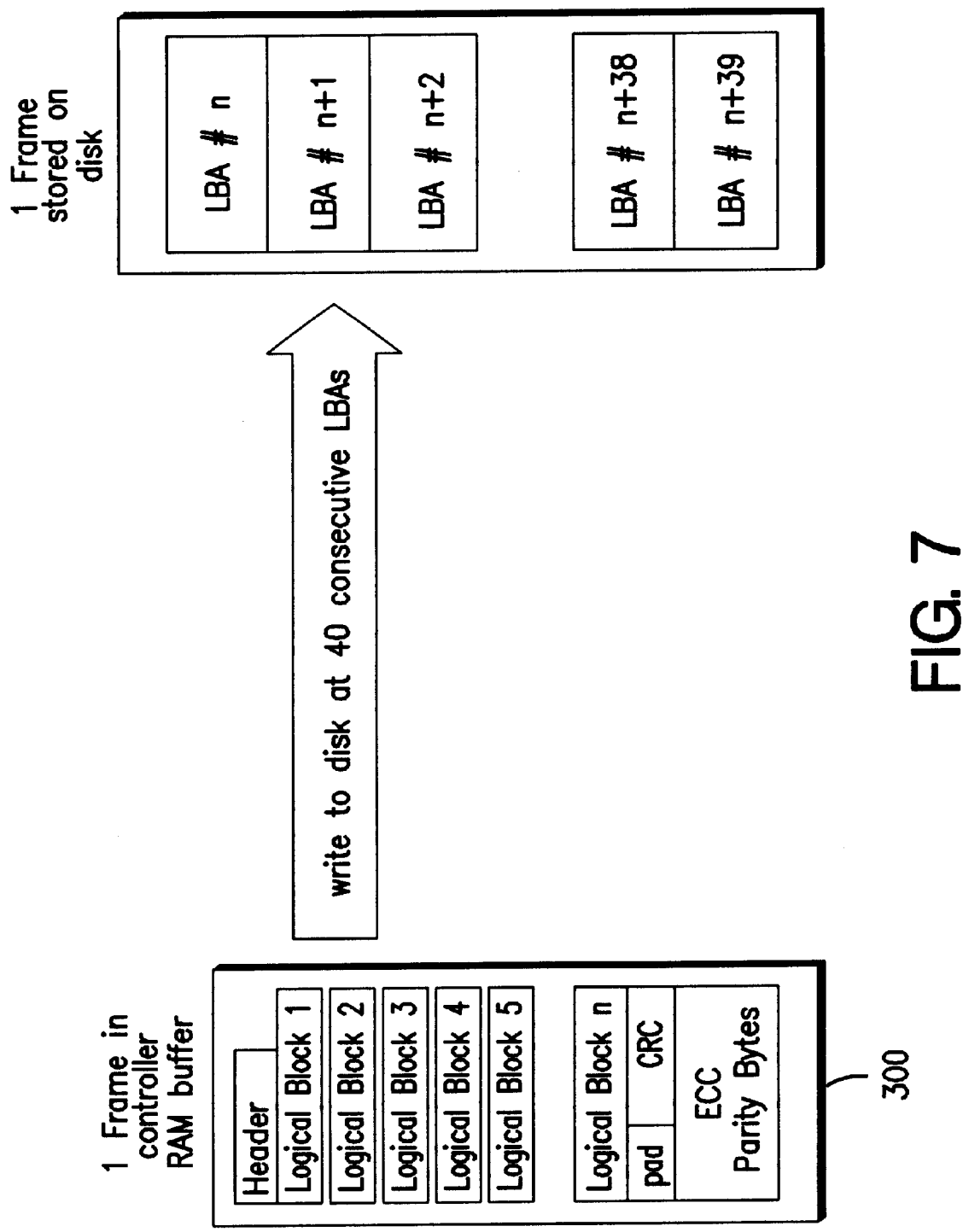
FIG. 7 is a diagrammatic view showing a mapping of frames to disk sectors in the data storage system of FIG. 1.

FIG. 3 shows how frame 300 corresponds to sectors of the disk 24, it being remembered that a frame utilizes the data areas of forty sectors of disk 24. In addition, FIG. 7 shows the recording of frame 300 on disk 24, the sectors of disk 24 each having a corresponding logical block address number (e.g., LBA #n, LBA #n+1, etc.). In this regard, disk sectors are addressed as "LBAs". The LBAs of disk 24 are numbered consecutively from zero up to the maximum the disk can store. All LBAs represent defect-free physical sectors on disk 24, and hence do not necessarily represent contiguous physical locations on disk 24.

Figure 8:
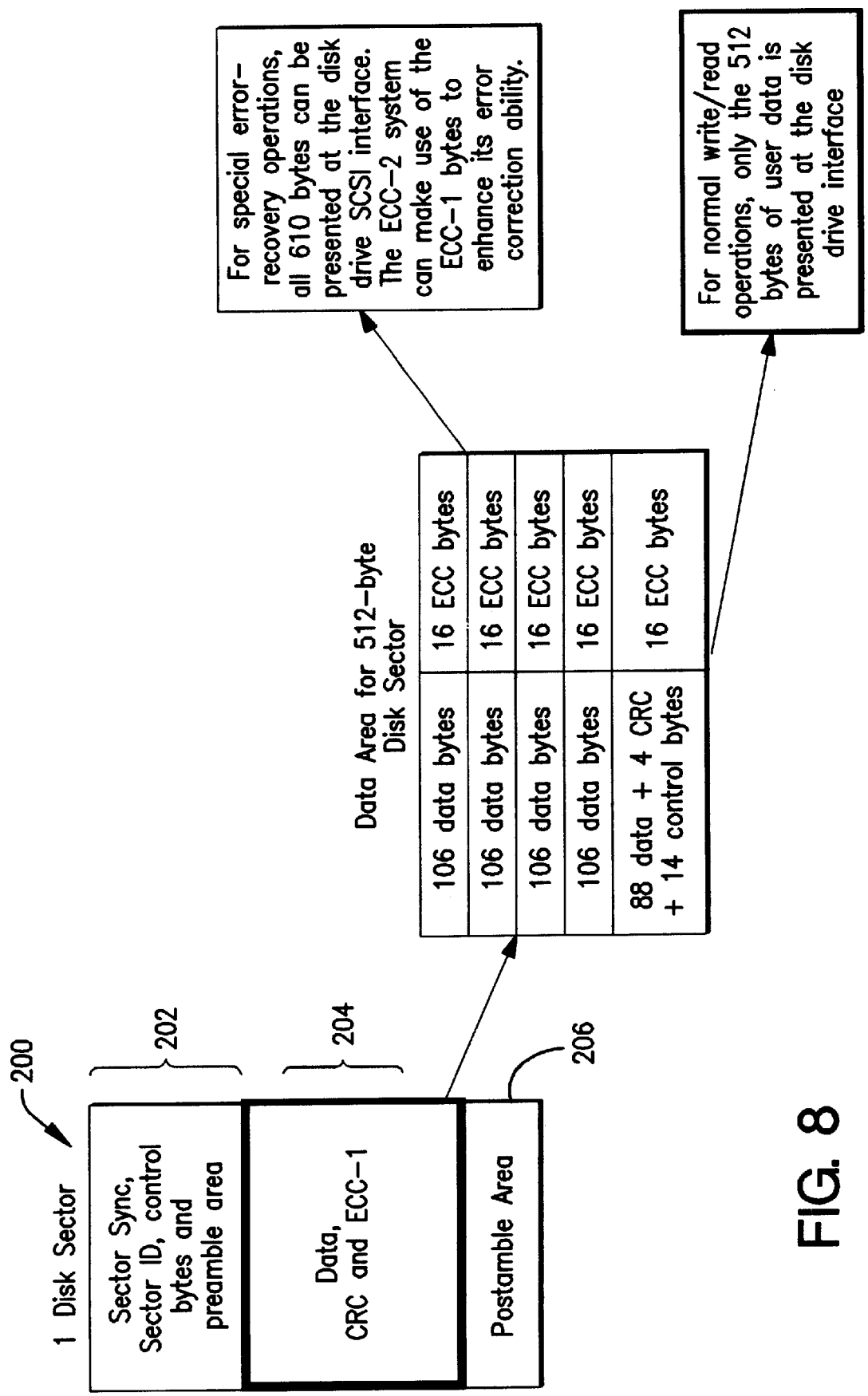
FIG. 8 is a diagrammatic view showing embedded disk sector format and error correction information.

When disk drive 22 records a sector on disk 24, the sector is formatted as shown by sector 200 FIG. 8. Each sector includes preamble area 202; a sector data area 204; and sector postamble area 206. Sector preamble area 202 includes sector identification information such as a sector synchronization field, a sector identification number, and various control bytes. Sector data area 204 includes the 512 user data bytes (which gives sector 200 the denomination as a "512 byte" sector), as well as disk drive-generated sector error correction bytes. As shown in FIG. 8, in sector data area 204 sixteen sector ECC bytes (shown in the drawings as ECC-1) are generated over each of four groupings of one hundred six data bytes. In addition, sixteen sector ECC bytes are generated over a set of bytes comprising the last eighty eight data bytes of the sector, four disk drive-generated CRC bytes of the sector, and disk drive-generated fourteen control bytes of the sector.

All information in sector 200 of FIG. 8 except the 512 data bytes are generated by the disk drive 22 for inclusion in sector 200. The 512 data bytes, on the other hand, are obtained from a portion of a frame 300 generated by tape drive emulator 30 (e.g., a portion of frame 300 corresponding to one horizontal row of FIG. 3).

As explained above, the disk drive-generated sector ECC bytes cover essentially only the 512 data bytes of sector 200 shown in FIG. 8. Importantly, the disk drive-generated sector ECC bytes do not cover the an information included in sector preamble area 202. Therefore, if sector 200 is not deemed a defective sector at manufacturing, but sector 200 later becomes contaminated e.g., by manipulation of removable disk 24, an error in sector preamble area 202 cannot be corrected by the error correction techniques employed by disk drive 22. For example, an error occurring in sector preamble area 202 could render the entire sector 200 irretrievable and/or unreadable.

The present invention overcomes the problem of an error in portions of sector 200 such as sector preamble area 202. In fact, in accordance with the present invention, inability of disk drive 22 to obtain or read an entire sector 200 from disk 24 is essentially immaterial to operation of data storage system 20. In this regard, and as explained in more detail below, the provision of frame error correction bytes 308 enable tape drive emulator 30 to generate as many as two sectors of a frame which otherwise would be unreadable by disk drive 22.

Figure 5:
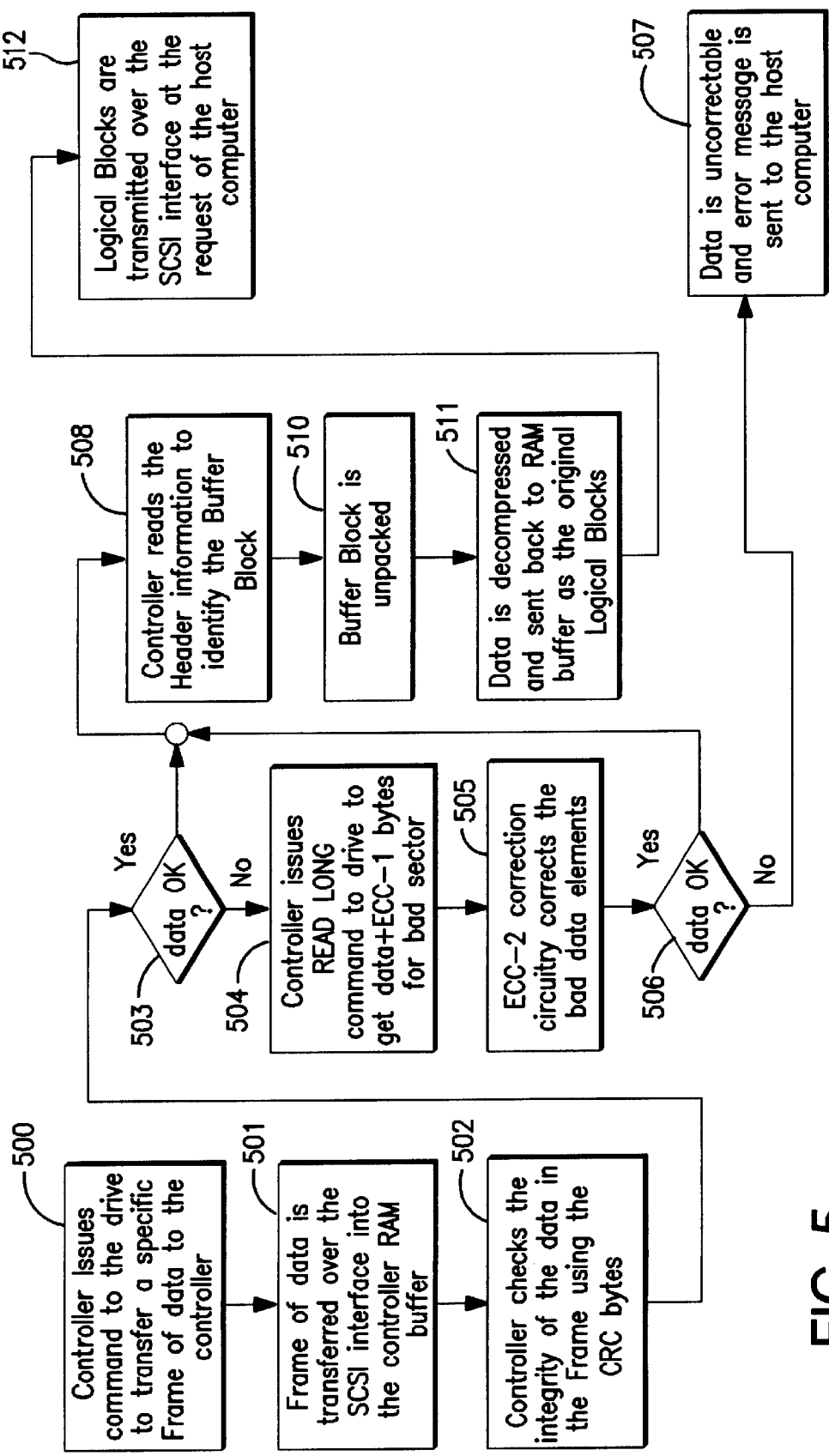
FIG. 5 is a flowchart generally showing steps involved in a playback process using the data storage system of FIG. 1.

FIG. 5 shows basic steps involved in playing back, e.g., reading, information recorded on removable disk 24. At step 500, tape drive emulator 30 issues to disk drive 22 a read command to transfer data to tape drive emulator 30. The read command issued from tape drive emulator 30 to transfer data is in response to a similar command issued to tape drive emulator 30 from host computer 40. Since host computer 40 thinks that it is connected to a tape drive, its command to tape drive emulator 30 will prompt tape drive emulator 30 to request a frame of data from disk drive 22. In response to the read command issued by tape drive emulator 30, disk drive 22 obtains forty sectors from disk 24. As indicated by step 501, the sector data areas of these forty sectors (which constitutes a frame) are transferred over cable 40 to tape drive emulator 30. In tape drive emulator 30, the sectors are transmitted through drive interface channel 106 to PCI bus 110 (via PCI interface 114) and (via PCI interface 150 and buffer manager 170) into an appropriate location (e.g., next available location) in buffer 172. Section 172D of FIG. 6 shows the contents of a frame upon receipt from disk drive 22.

At step 502 the frame just obtained from disk drive 24 is transferred (via buffer manager 170) to ECC encoder and decoder 166 for an integrity check. ECC encoder and decoder 166 which performs an error location operation to determine at step 503 whether any errors reside in the frame (e.g., if syndromes generated by ECC encoder and decoder 166 indicate any errors) and the location of such errors (e.g., by generation of an error locator polynomial). If any errors are detected in the frame, steps 504–506 are executed before resuming execution at step 508.

In the event that ECC encoder and decoder 166 detects an error in the frame, the sector ECC information generated by disk drive 22 would be useful in correcting the errors. In this regard, at step 504 tape drive emulator 30 issues to disk drive 22 a special command to obtain, for the erroneous sector(s) of the frame just read, not only the 512 data bytes, but also the eighty sector ECC bytes which cover sector data area 204 (see FIG. 8). The special type of command which obtains the sector ECC bytes in addition to user data bytes is commonly called a READ LONG command. Such a READ LONG command enables recovery of all six hundred ten bytes of sector data area 204 at the disk drive SCSI interface.

At step 505, ECC encoder and decoder 166 uses both the sector ECC bytes and the frame ECC bytes 308 (see FIG. 3) in order to generate correction bytes which are substituted into the erroneous bytes indicated by the error locator polynomial. Error correction performed by ECC encoder and decoder 166 is hereinafter described in more detail with reference to FIG. 9 and FIG. 10. If it turns out that the frame is uncorrectable, an error message is sent to host computer 40 as indicated by step 507. Otherwise, the corrected frame is returned (via buffer manager 170) to buffer 172 and execution continues with step 508.

Step 508 involves controller 160 reading header bytes 310 of the frame (see FIG. 3) in order to obtain identification information from the frame. After the frame is properly identified, at step 510 the buffer block (e.g., corresponding to the first thirty eight sectors of the frame) is unpacked. In particular, at step 510 the buffer block is sent via buffer manager 170 to buffer block packer & unpacker 163 where the buffer block is unpacked and returned to buffer 172. The unpacking of the buffer block is represented by the transition from section 172C to 172B in FIG. 6.

After being unpacked, the unpacked but still-compressed logical blocks obtained from the buffer block are next sent from buffer 172 to compression and decompression engine 162 where (at step 511) the logical blocks are decompressed. The decompressed data is then loaded into an appropriate location in buffer 172, with the decompressed data now being allocated in logical blocks as shown by section 172A in FIG. 6.

Step 512 shows the logical blocks being transmitted from tape drive emulator 30 to host computer 40. In the transmission, the logical blocks are obtained by buffer manager 170 from buffer 172, and applied via PCI interface 150 to PCI bus 110 to host interface channel 104 (via PCI interface 112). From host interface channel 104 the logical blocks are applied on cable 42 to host computer 40 in conventional manner.

Figure 23:
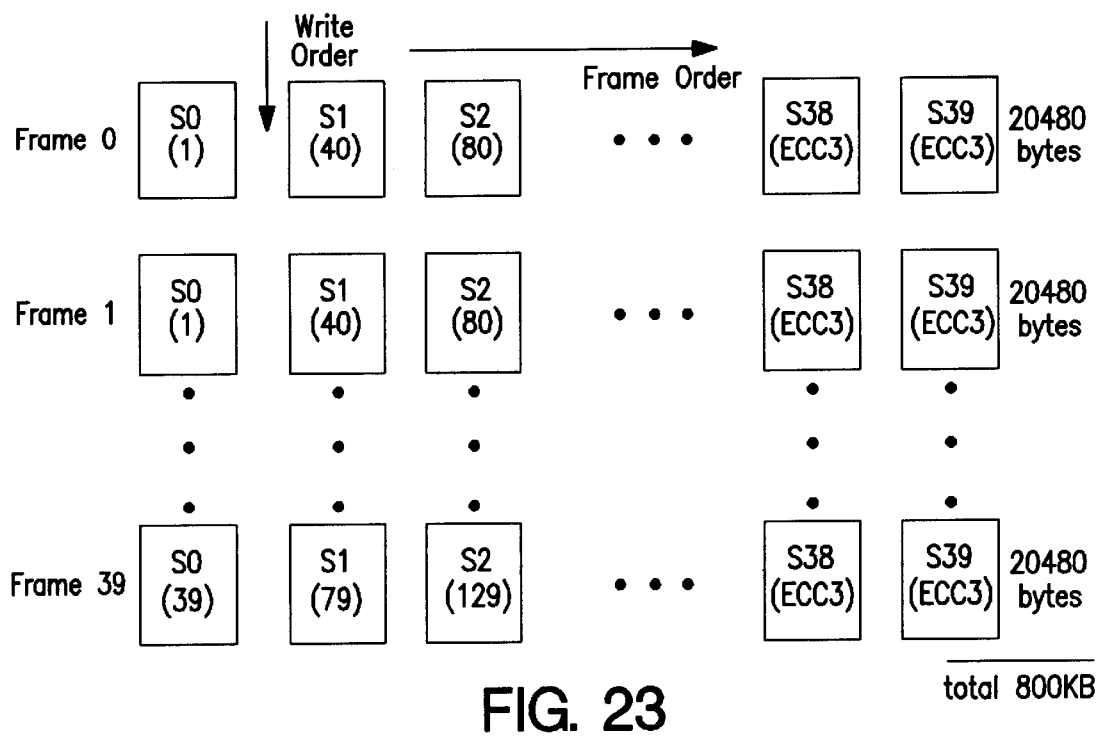
FIG. 23 is a diagrammatic view showing interleaving of sectors of differing frames.

In the first mode of the invention, the sectors comprising a frame can be laid down on the disk in various manners. As one example, the sectors comprising a frame can be consecutively recorded on the disk. As an alternatively example, using the sectors of differing frames can be recorded in interleaving fashion on the disk. In this regard, FIG. 23 shows a forty-way interleave technique. Each block in FIG. 23 represents a sector, with the sectors of each frame being sequentially designated as "S0", "S1", etc. The parenthetical numbers in the user data sectors indicate the recording order of the sectors on the disk.

Figure 19:
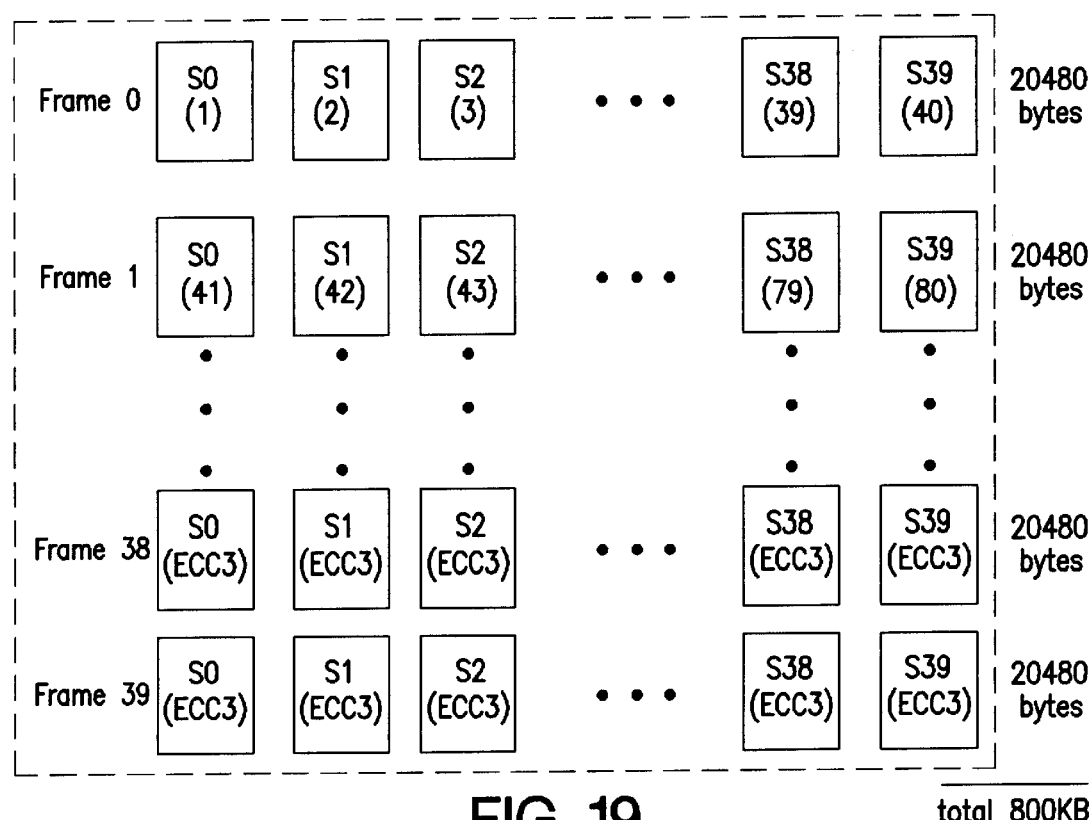
FIG. 19 is a diagrammatic view showing a super frame for use with the data storage system of FIG. 1.
Figure 20:
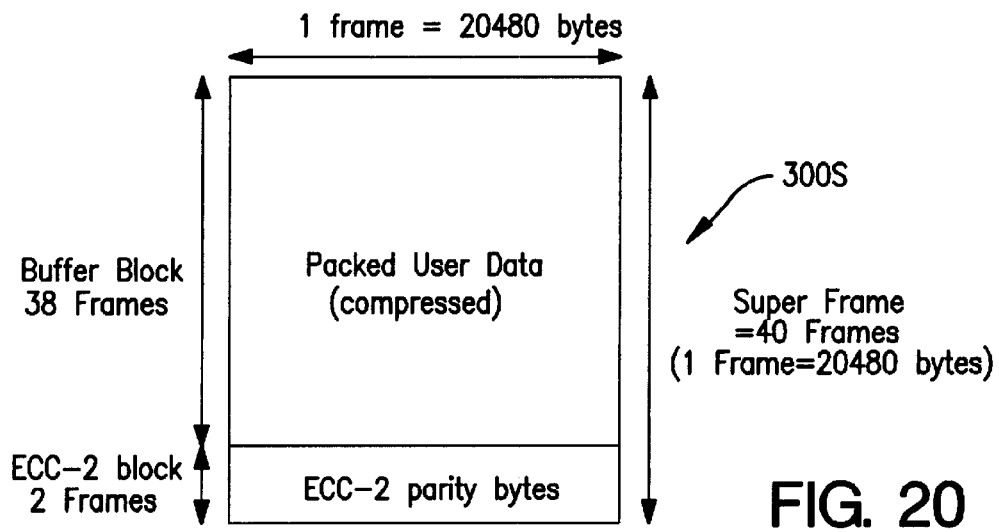
FIG. 20 is another diagrammatic view showing the super frame of FIG. 19.

In now turning to the second mode of the invention, the concept of "frame" herein described also covers a super frame which is described in connection with FIG. 19. In this regard, FIG. 19 depicts a scheme for laying out a super frame on the disk. A super frame comprises plural frames, with at least one of the frames being an ECC frame which enables recovery of data over the entire super frame. The example super frame shown in FIG. 19 comprises forty frames, each frame comprising forty sectors in like manner as the frames previously described. Thus, the illustrative superframe of FIG. 19 comprises sixteen hundred sectors. Each block shown in FIG. 19 represents a sector; each row of FIG. 19 constitutes a frame having sectors number from S0 to S39. The numbers in parenthesis for the sectors of the first thirty eight frames represent the order in which the sectors are recorded on the disk. FIG. 20 is another illustration of the embodiment of the super frame of FIG. 19.

Figure 20A:
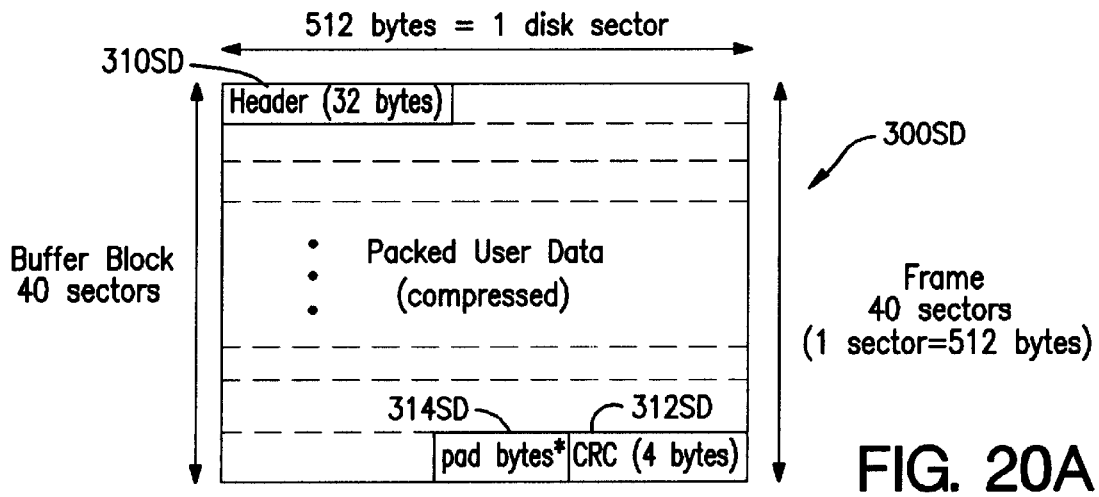
FIG. 20A and FIG. 20B are diagrammatic views of embodiments of frames utilized in the super frame of FIG. 19.

A super frame of the invention comprises both user data frames and ECC frames. An example user data frame 300SD of a super frame is shown in FIG. 20A. The user data frame 300SD resembles the frame 300 of FIG. 3, except for the fact that all forty sectors have packed user data (i.e., no ECC), and the pad bytes 314SD and CRC bytes 312SD are in the last sector of the user data frame 300SD. A user data frame 300SD also has a header 310SD, in like manner with header 310 of frame 300.

In the super frame illustrated in FIG. 19, the last two frames (e.g., frame 38 and frame 39) are ECC frames. An EEC frame 300SE of a super frame has the same format as the user data frame 300SD, with the only difference being that all sectors contain ECC bytes computed over the entire super frame. The ECC frame 300SE has a header 310SE, and CRC bytes 312SE located identically as corresponding elements of user data frame 300SD.

Using the super frame of FIG. 19, the number of consecutive erroneous sectors that can be corrected is eighty. The increase in the number of sectors correctable is increased in the FIG. 19 mode in view of the fact that the error correction (ECC) is computed over thirty eight frames instead of thirty eight sectors. It should be understood that the FIG. 19 mode applies the same principle as previously discussed however, with the size of the frame in the FIG. 19 mode not being forty sectors (thirty eight data sectors plus two ECC sectors), but instead being sixteen hundred sectors (of which 1520 sectors are data sectors and eighty sectors are ECC sectors). For sake of genericness, the term "set" is employed to refer either to a frame of the first mode, or to a super frame of the second mode. Similarly, the term "unit" refers to a sector in context of the first mode, and to a frame in the context of the second mode.

Figure 21:
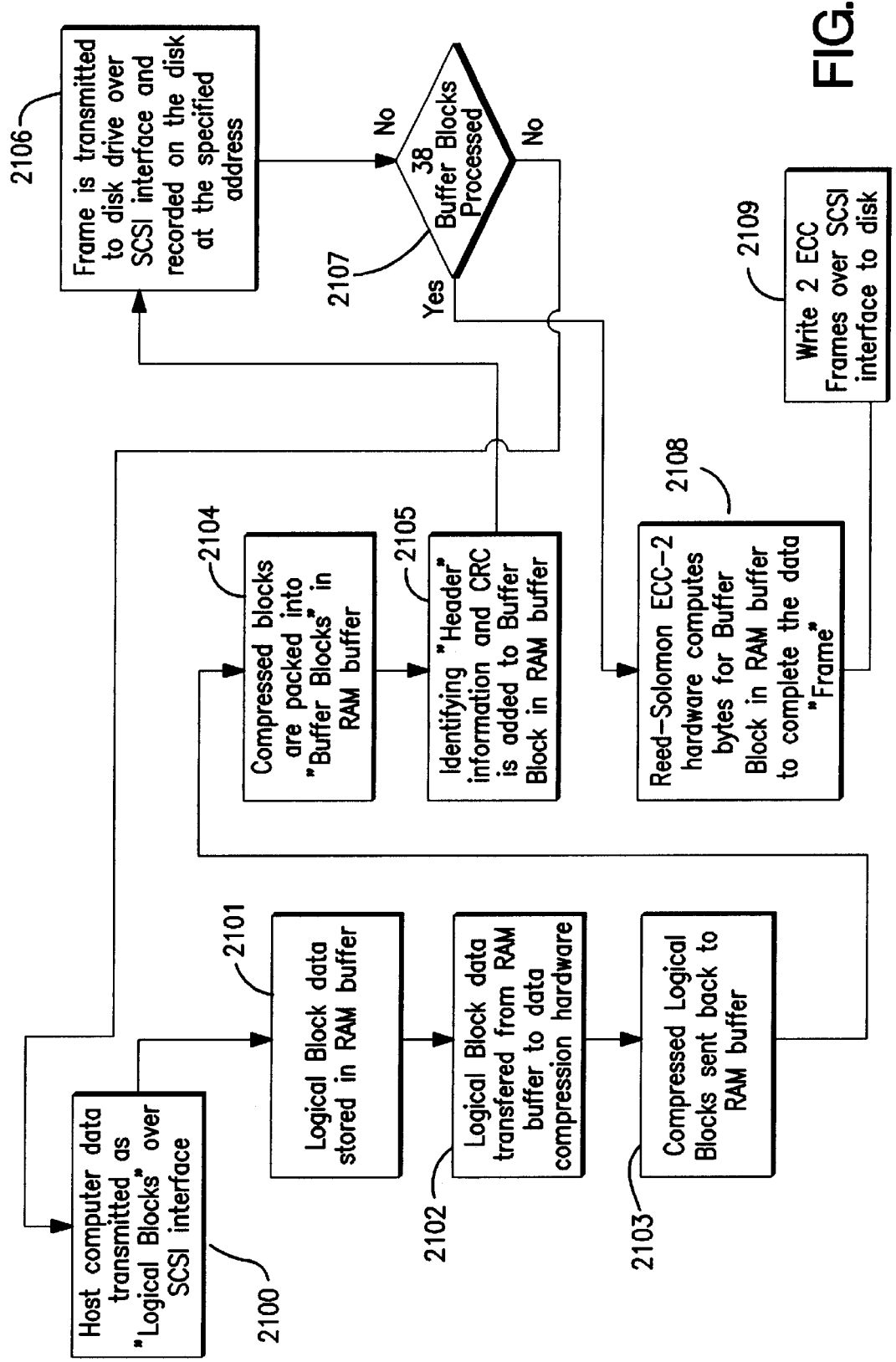
FIG. 21 is a flowchart generally showing steps involved in a recording process for the super frame of FIG. 19.

FIG. 21 shows basic steps depicted in a recording or write process in which user data from host computer 40 is recorded on disk 24 in a super frame such as that shown in FIG. 19. It will be seen that FIG. 21 resembles FIG. 4, with the primary exception being the time of generation of the ECC-2 (which takes the form of super frame ECC bytes). Various details above-discussed with reference to FIG. 4 are thus applicable to FIG. 21.

As indicated by step 2100, host computer 40 transmits logical blocks of user data over cable 42 for reception at host interface channel 104 (see FIG. 2). At an appropriate time, the logical blocks are transmitted over PCI bus 110 to formatter/deformatter 100 and are stored, under control of buffer manager 170, in appropriate memory locations in buffer 172 (step 1201). At step 2102 the logical blocks are transferred to compression and decompression engine 162 for compression, and at step 2103 the compressed logical blocks are returned to buffer 172. Then, as shown by step 2104, a set of compressed logical blocks are packed into a buffer block.

When the user data portion of a buffer block is filled (see FIG. 20A) with host computer data, i.e., user data, a frame header 310SD and buffer block CRC bytes 312SD (see FIG. 20A) are generated for the current buffer block at step 2105. For the super frame mode of FIG. 19, user data will be laid down in each of the forty sectors of the first thirty eight frames of a super frame (in the manner shown in FIG. 20A).

At step 2106 the buffer block is utilized as a user data frame (such as that illustrated in FIG. 20A) which is transmitted to the disk drive over the SCSI and recorded on the disk. At step 2107 a check is made whether thirty eight consecutive user data-filled buffer blocks (i.e., thirty eight consecutive frames) have been recorded on the disk. If thirty eight consecutive user data-filled buffer blocks have not yet been recorded, processing returns to step 2100 for obtaining yet another buffer block (i.e, another user data frame 300SD).

Figure 20B:
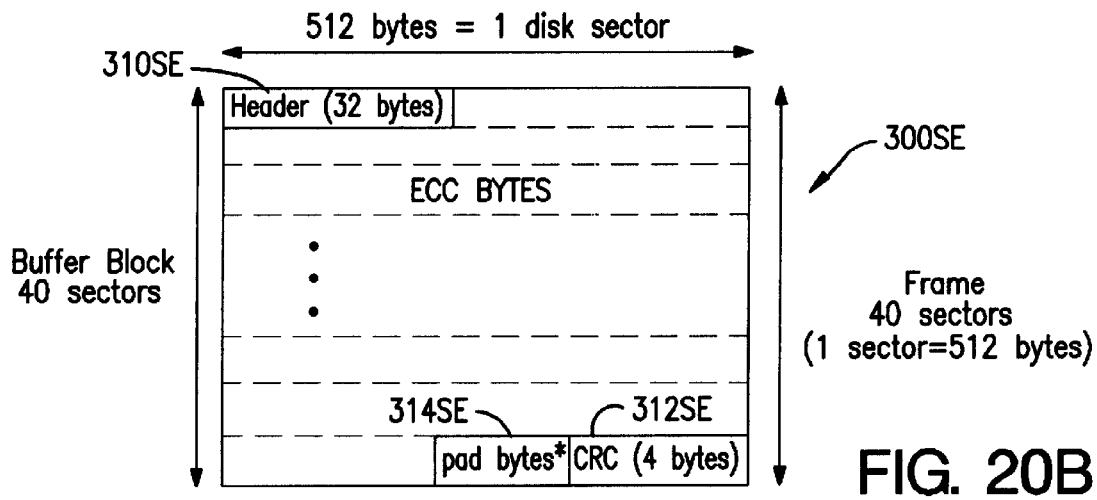

When thirty eight consecutive user data-filled buffer blocks have been recorded on the disk, it is time to generate and record the ECC frames 300SE (see FIG. 20B). At step 2108 ECC encoder and decoder 166 generates ECC two frames over the thirty eight consecutive user data-filled buffer blocks, i.e., over the thirty eight consecutive user data-filled frames which precede the recording of the two EEC frames on the disk. Then, at step 2109, the two ECC frames (the last two frames of the super frame) are transmitted to the disk drive over the SCSI interface and recorded on the disk.

Figure 9:
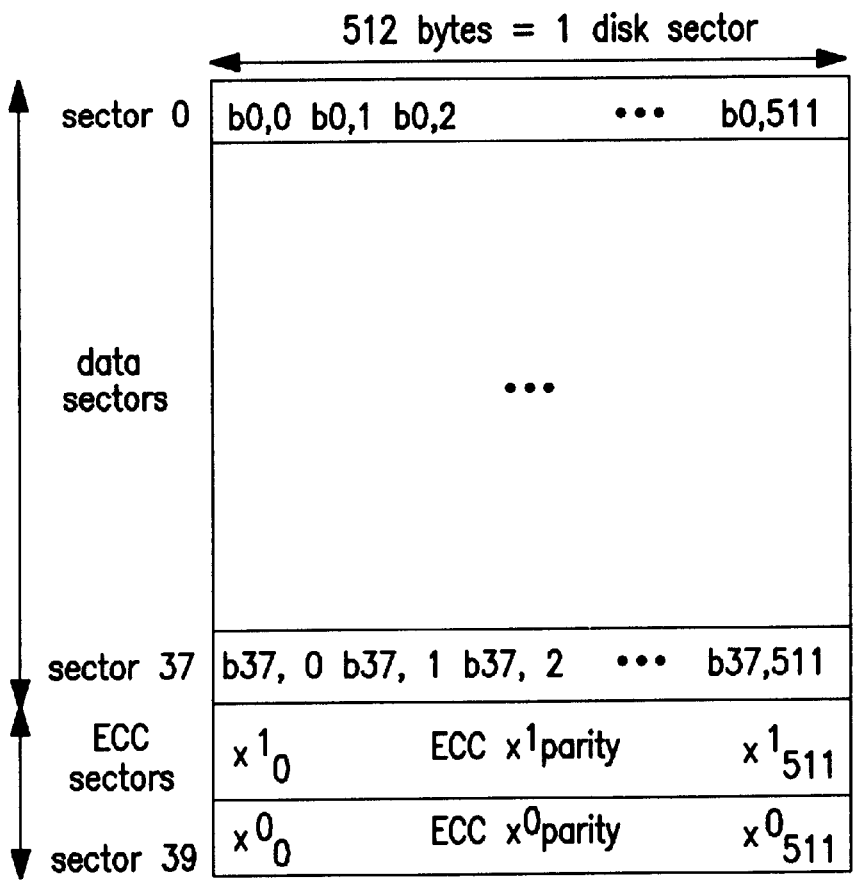
FIG. 9 is a diagrammatic view showing implementation of error correction in a frame data structure.
Figure 10:
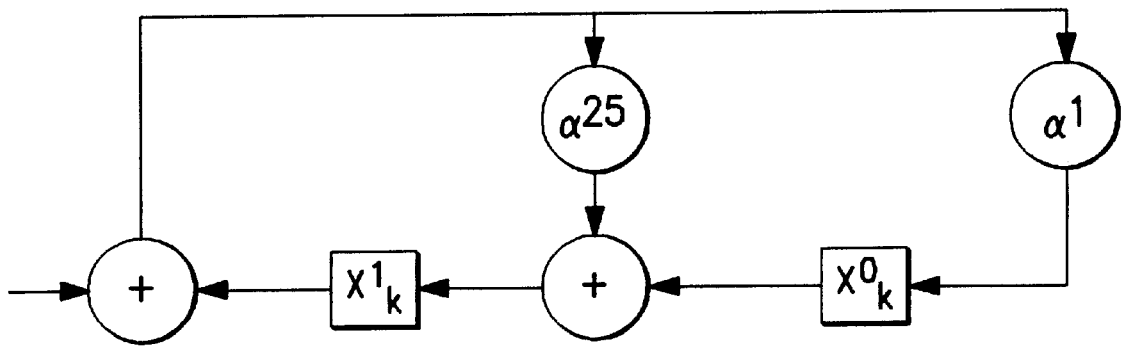
FIG. 10 is a schematic view of error correction logic utilized in the data storage system of FIG. 1.
Figure 9A:
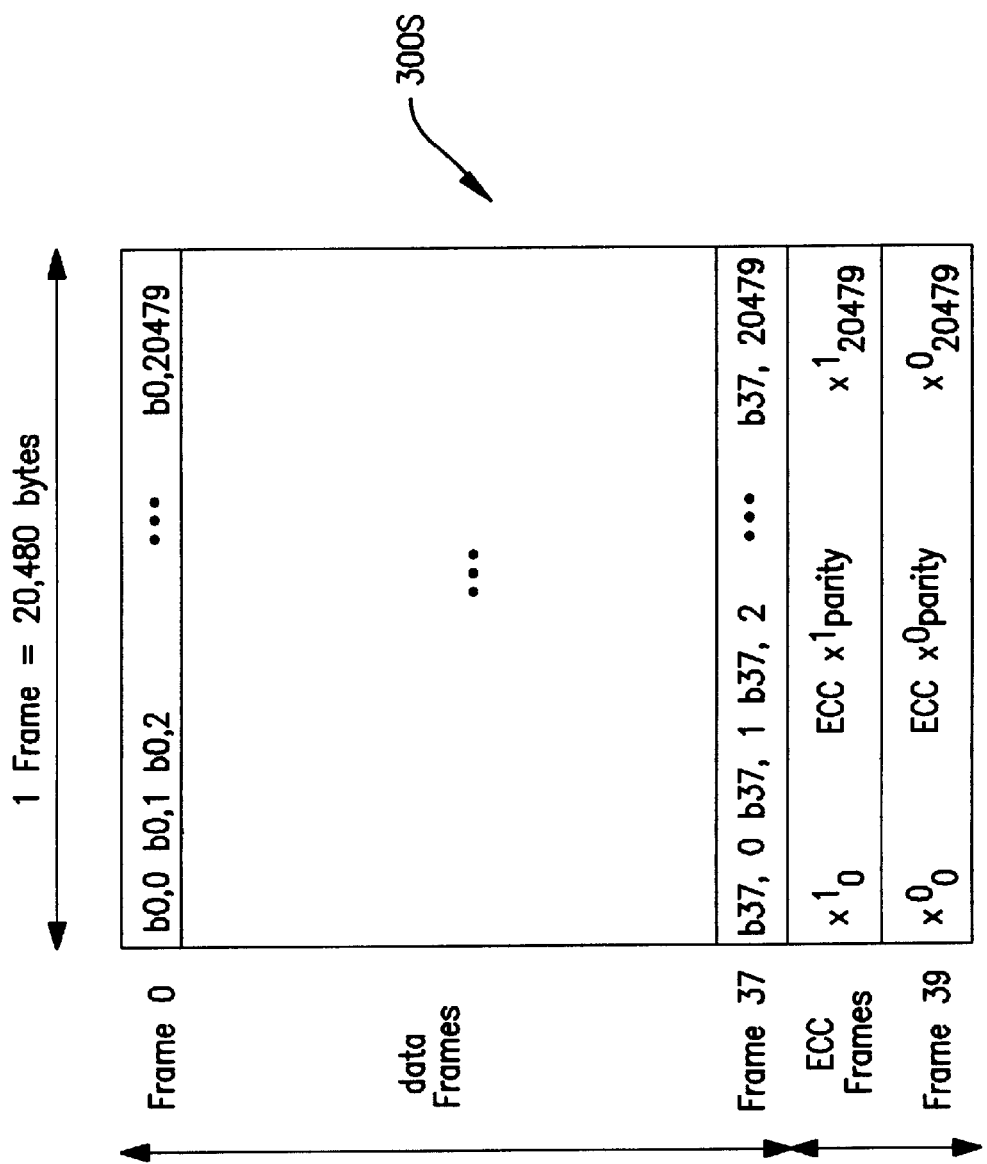
FIG. 9A is a diagrammatic view showing implementation of error correction in a super frame data structure.

The frame error correction charaters (ECC) implemented by the super frame embodiment of present invention is illustrated in FIG. 9A and FIG. 10. FIG. 9A shows how byte position assignments are allocated within super frame 300S, the nomenclature $b_{j,k}$ again being employed to depict byte position with the matrix of the frame, "j" being the row and "k" being the column. The same (40,38,3) Reed-Solomon code as above discussed is employed using a Galois Field Generator for $GF(2^8)$ defined as $G_\alpha(x)=x^8+x^4+x^3+x^2+1$, using the same ECC generator polynomial as discussed in connection with the first embodiment. FIG. 10 is also applicable to the super frame embodiment, it being understood that k is the column number which ranges from zero to 20,479.

Figure 22:
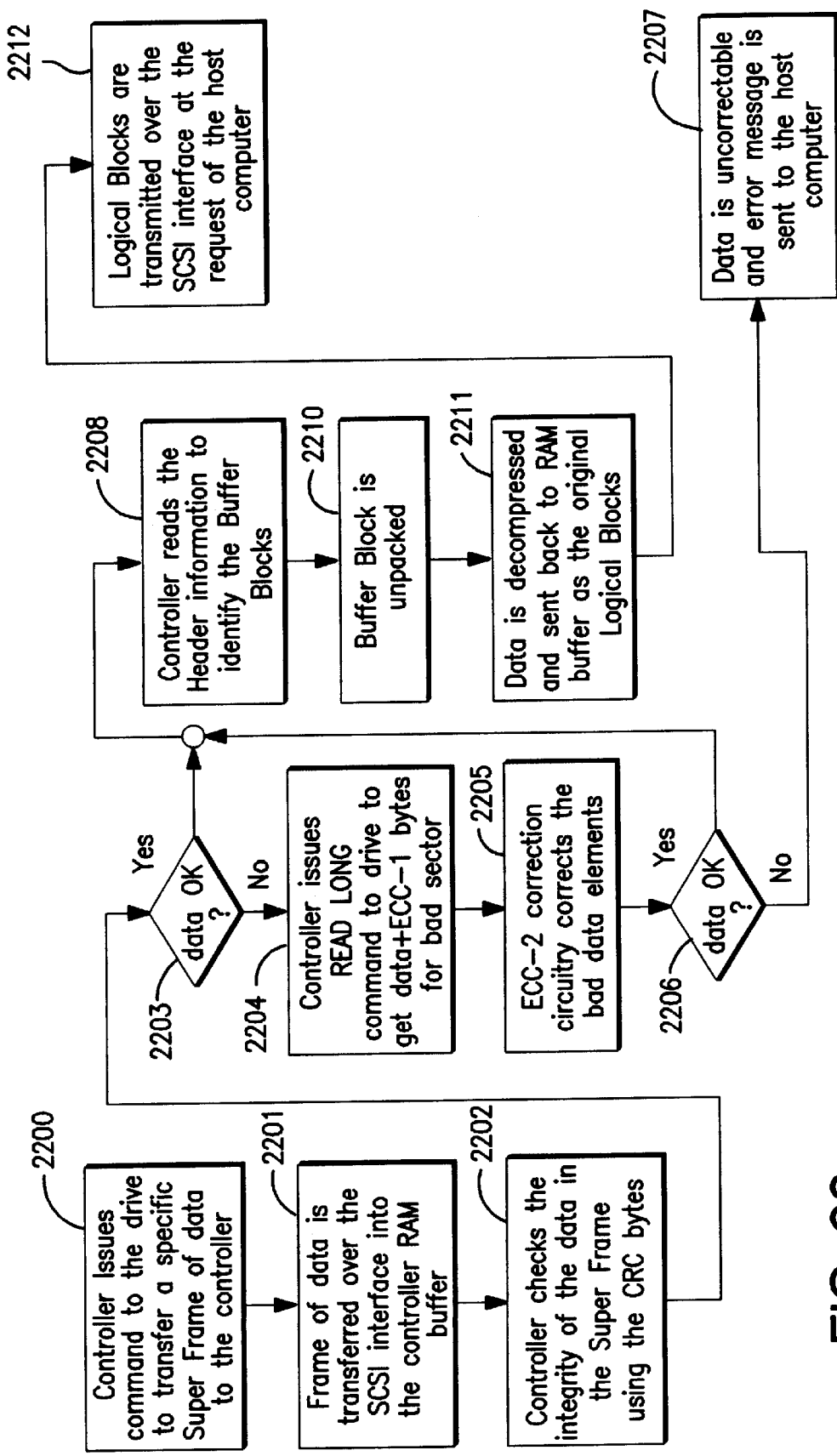
FIG. 22 is a flowchart generally showing steps involved in a playback process for the super frame of FIG. 19.

FIG. 22 shows basic steps involved in playing back, e.g., reading, information recorded in a super frame (see FIG. 19) on removable disk 24. It will be seen that the operations of FIG. 22 are essentially the same as those of FIG. 5, particularly when the "frame" of FIG. 5 is construed to be a super frame. Various details above-discussed with reference to FIG. 5 are thus applicable to FIG. 22.

Steps 2200 through 2203 of FIG. 22 are essentially the same as steps 500 through 503 of FIG. 5, including reading a super frame being read from disk drive 22 and determining (at step 2203) whether any errors reside in the frame. Step 2204 involves a read long operation to obtain the primary ECC bytes for bad sector(s), followed at step 2205 by attempted correction using both the primary ECC and the secondary ECC. In the super frame scenario, the secondary ECC is obtained from the two ECC frames (e.g., the last two frames) of the super frame (see FIG. 19). If it turns out that the error is uncorrectable, an error message is sent to host computer 40 as indicated by step 2207.

Step 2208 involves controller 160 reading header bytes 310SD of each of the thirty eight user data frames of the super frame (see FIG. 20A) in order to obtain identification information from each user data frame. After each user data frame is properly identified, at step 2210 each frame (i.e., each buffer block is unpacked. After being unpacked, the unpacked but still-compressed logical blocks of the frame are decompressed at step 2211. The decompressed logical blocks are then at step 2212 transmitted to host computer 40.

The frame error correction (ECC) implemented by the first embodiment of present invention, and particularly utilized by ECC encoder and decoder 166, is illustrated in FIG. 9 and FIG. 10. FIG. 9 shows how byte position assignments are allocated within frame 300, the nomenclature $b_{j,k}$ being employed to depict byte position with the matrix of the frame, "j" being the row and "k" being the column.

In the illustrated embodiments, a (40,38,3) Reed-Solomon code is employed using a Galois Field Generator for $GF(2^8)$ defined as $G_\alpha(x)=x^8+x^4+x^3+x^2+1$. The ECC generator polynomial for the frame ECC bytes is given by:

$$G(x)=(x+\alpha^0)(x+\alpha^1)$$

$$G(x)=x^2+x(\alpha^0+\alpha^1)+\alpha^0\alpha^1=x^2+\alpha^{25}x+\alpha^1$$

where $\alpha$ is the primitive root of $GF(2^8)$, where $\alpha=0\times01$; $\alpha^1=0\times02$; and $\alpha^{25}=\alpha^0+\alpha^1=0\times03$. FIG. 10 is a block diagram of an implementation of G(x), the arrow from the left indicating introduction of data bytes b0,k . . . b37,k, where k is the column number which ranges from zero to 511. In FIG. 10, $x^0{}_k$ and $x^1{}_k$ are the frame ECC bytes for column k.

Figure 11:
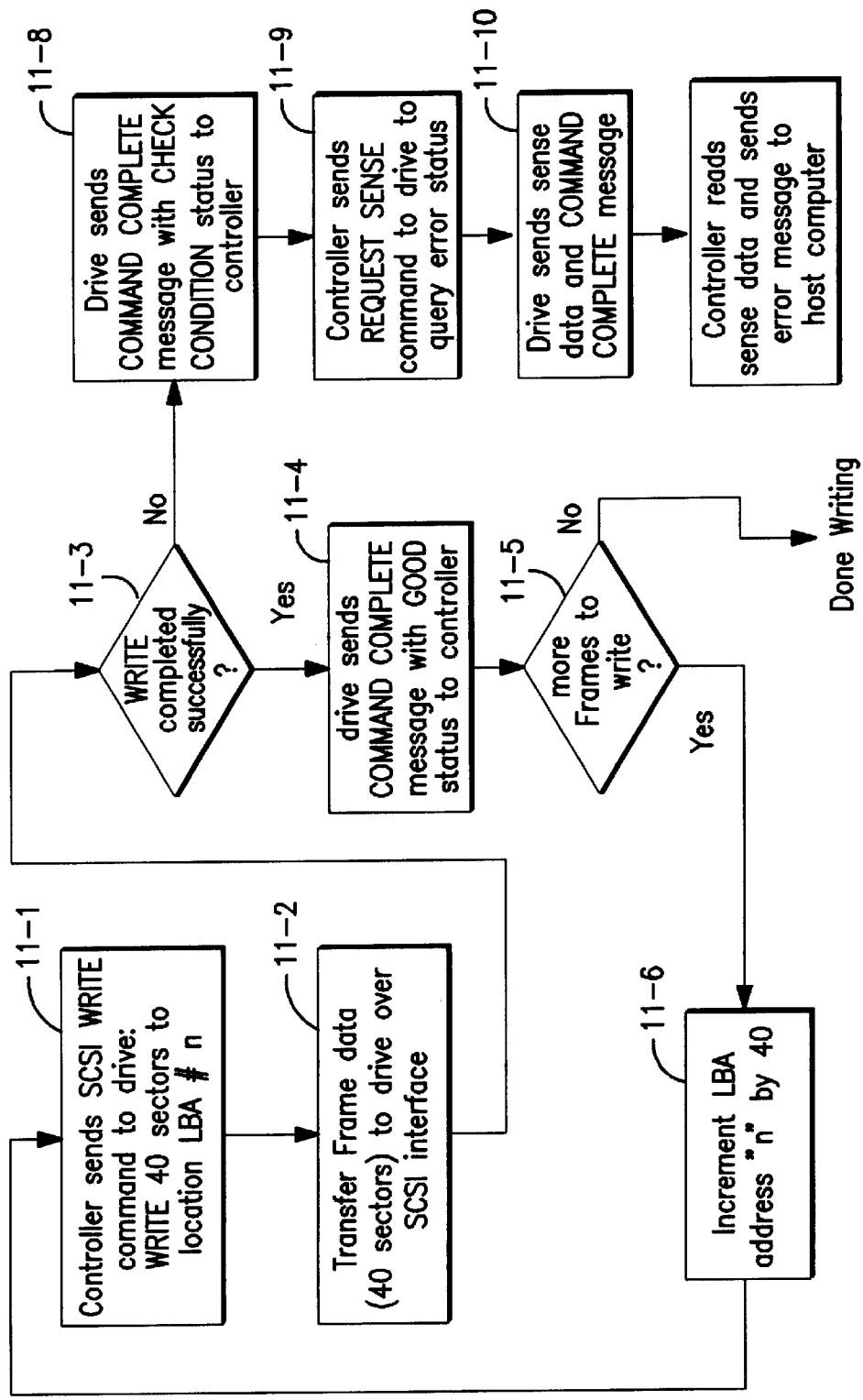
FIG. 11 is a flowchart generally showing exemplary steps involved in signaling between a tape drive emulator and a removable disk drive in a recording process for the data storage system of FIG. 1.
Figures 12, 12A:
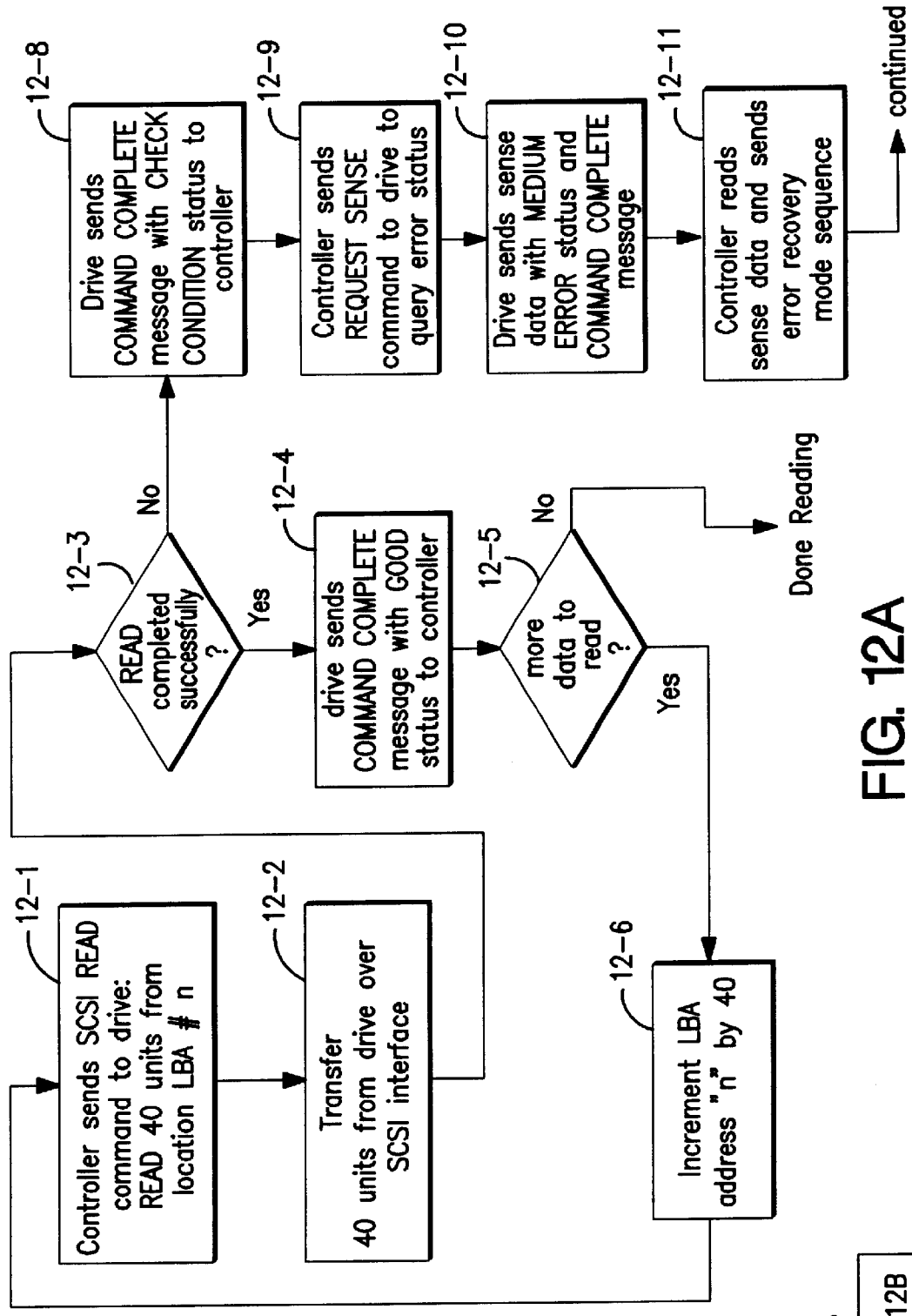
FIG. 12 is a diagrammatic view showing a relationship between FIG. 12A and FIG. 12B.
FIG. 12A and FIG. 12B are flowcharts generally exemplary showing steps involved in signaling between a tape drive emulator and a removable disk drive in a playback process for the data storage system of FIG. 1.
Figure 12B:
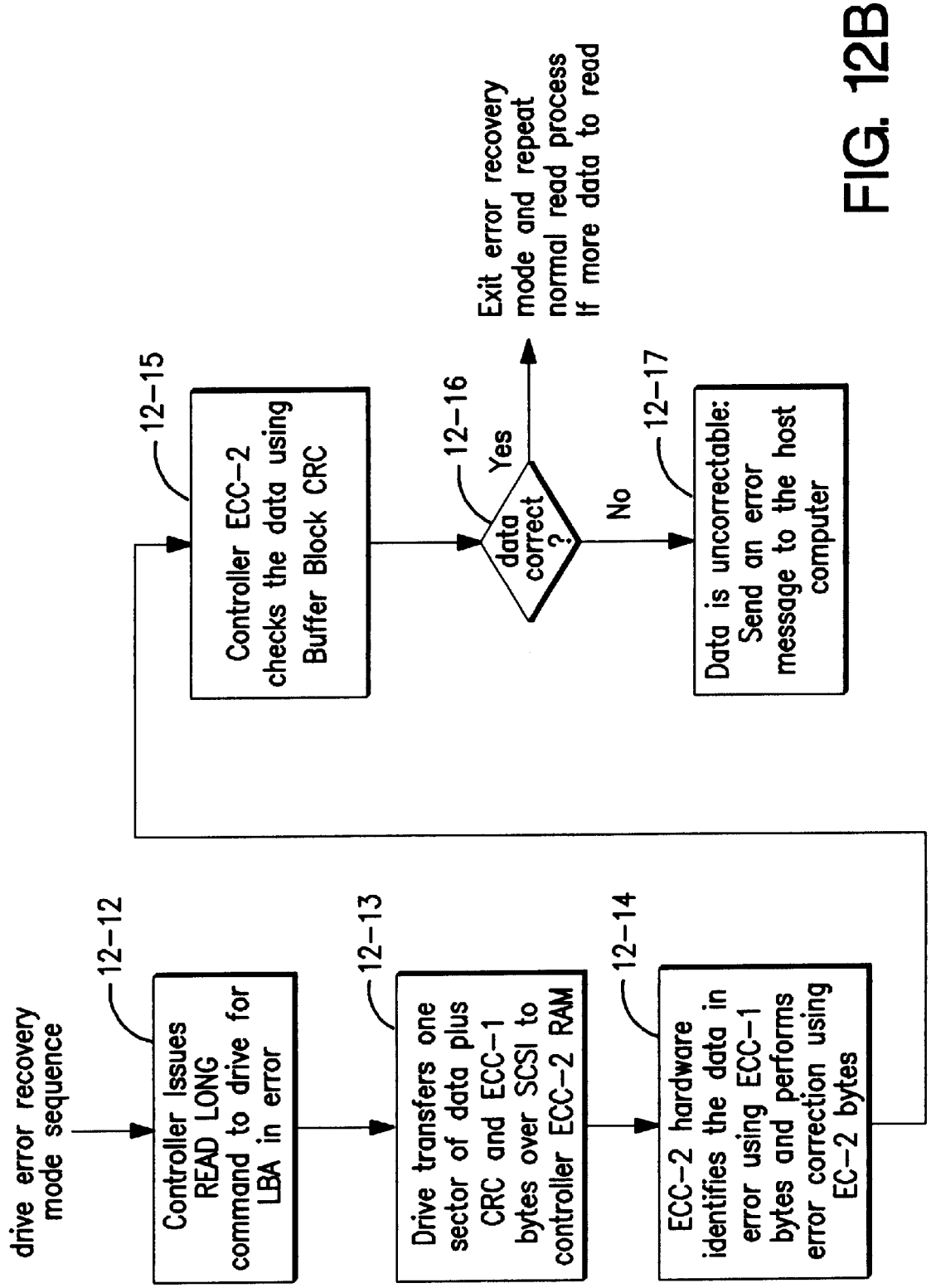

In connection with recording and playback operations, signaling occurs between tape drive emulator 30 and disk drive 22. FIG. 11 shows basic steps involved in write or recording signaling between tape drive emulator 30 and drive 22; FIG. 12A and FIG. 12B show basic steps involved in playback or read signaling between tape drive emulator 30 and drive 22. It should be understood that FIG. 11 referring to recording operations, and FIG. 12A and FIG. 12B referring to playback operations, all refer to both the frame and super frame modes of the invention. In this regard, in these figures, the term "unit" is to be construed as a sector for the frame mode. On the other hand, the term "unit" is to be construed as a frame for the super frame mode.

In a recording or write process, host computer 40 directs tape drive emulator 30 to store data on the storage medium. In response, at step 11-1 tape drive emulator 30 sends a SCSI WRITE command to disk drive 22, specifying that forty units be written beginning in location block address (LBA) #n. In the frame mode, forty sectors are read from the disk; in the super frame mode forty frames are read from the disk. Step 11-2 depicts the transfer of forty units, over cable 44 to disk drive 22. At step 11-3 disk drive 22 determines whether the recording on disk 24 was successfully completed. If the recording on disk 24 was successful, at step 11-4 disk drive 22 sends a COMMAND COMPLETE message to tape drive emulator 30. If host computer 40 then has more data to be recorded (step 11-5), tape drive emulator 30 increments the LBA address "n" by forty (step 11-6) and sends another SCSI WRITE command to disk drive 22 (11-1). The loop of steps 11-1 through 11-6 continues as long as host computer 40 has more data to record.

In the event that a unit was not successfully recorded on disk 24 by disk drive 22, at step 11-8 disk drive 22 sends a COMMAND COMPLETE message with a check condition status to tape drive emulator 30. In response, at step 11-9 tape drive emulator 30 sends a REQUEST SENSE command to disk drive 22 to query the error status. Upon receipt of the query of error status, disk drive 22 sends a sense data and COMMAND COMPLETE message to tape drive emulator 30 as step 11-10. As shown by step 11-11, tape drive emulator 30 reads the sense data and sends an error message to host computer 40.

FIG. 12A and FIG. 12B show basic steps involved in playback or read signaling between tape drive emulator 30 and drive 22. When host computer 40 requires data from the storage medium (e.g., disk 24), a READ command is issued to tape drive emulator 30. In response, step 12-1 shows tape drive emulator 30 sending a SCSI READ command and to disk drive 22, specifically requesting that forty units (e.g., forty sectors in the frame mode; forty frames in the super frame mode) be read from a specified location (e.g., LBA #n). Upon receipt of the SCSI READ command, disk drive 22 transfers forty units worth of data over cable 44 to tape drive emulator 30 (step 12-2). In addition, disk drive 22 determines whether its read operation was successfully completed (step 12-3). If the read operation was successfully completed, disk drive 22 sends a COMMAND COMPLETE message with a good status to tape drive emulator 30 (step 12-4). Then, if host computer 40 still requests more data (determined at step 12-5), tape drive emulator 30 increments the logical block address (LBA #n) by forty (step 12-6) and issues a further SCSI READ command (step 12-2) to disk drive 22. The reading of data from disk 24 continues in this manner until it is determined at step 12-5 that host computer 40 has no further present requirement for data.

In the event that data was not successfully read by disk drive 22 from disk 24, at step 12-8 disk drive 22 sends a COMMAND COMPLETE message with a CHECK CONDITION status to tape drive emulator 30. Upon noting the CHECK CONDITION status, at step 12-9 tape drive emulator 30 sends a REQUEST SENSE command to disk drive 22 in order to query the error status. In response, at step 12-10 disk drive 22 sends sense data with medium error status and a COMMAND COMPLETE message to tape drive emulator 30. At step 12-11, tape drive emulator 30 reads the sense data and enters an error recovery mode sequence which is particularly depicted in FIG. 12B.

In the error recovery mode sequence of FIG. 12B, at step 12-12 tape drive emulator 30 issues a READ LONG command to disk drive 22 for any sector(s) noted as containing an error. As depicted by step 12-13, with respect to each such error-containing sector the READ LONG command causes disk drive 22 to transfer to tape drive emulator 30 not only the 512 data bytes of the data area 204 (see FIG. 8), but also the sector ECC bytes generated by disk drive 22 and stored in sector data area 204.

At step 12-14, ECC encoder and decoder 166 of tape drive emulator 30 identifies the location of the error in the sector using the sector ECC bytes obtained from disk drive 22. Further, ECC encoder and decoder 166 then uses the sector set ECC bytes in order to perform error correction on the erroneous bytes. In the frame mode, the sector set ECC bytes are the ECC bytes which reside in the last two sectors of a frame (see FIG. 3); in the super frame mode the sector set ECC bytes are the ECC bytes which reside in the last two frames of a super frame (see FIG. 19). Thereafter, ECC encoder and decoder 166 checks the unit and its correction process by using the buffer block CRC bytes 312 (see FIG. 3 for the frame mode and FIG. 20A for the super frame mode) as shown in step 12-15. If the check at step 12-15 confirms that the data of the unit is correct (step 12-16), the error recovery mode sequence is terminated and execution continues with step 12-5 (to determine if further data is required by host computer 40). Otherwise, at step 12-17 an error message is sent to host computer 40, indicating that the requested data is uncorrectable.

Figure 14:
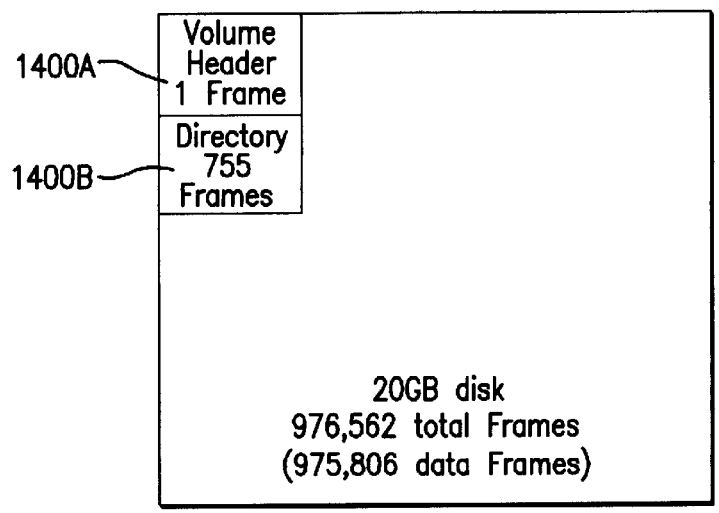
FIG. 14 is a diagrammatic view showing a relative location of a volume header frame, directory frames, and data frames in context of a format of a disk handled by the storage system of FIG. 1.
Figure 14A:
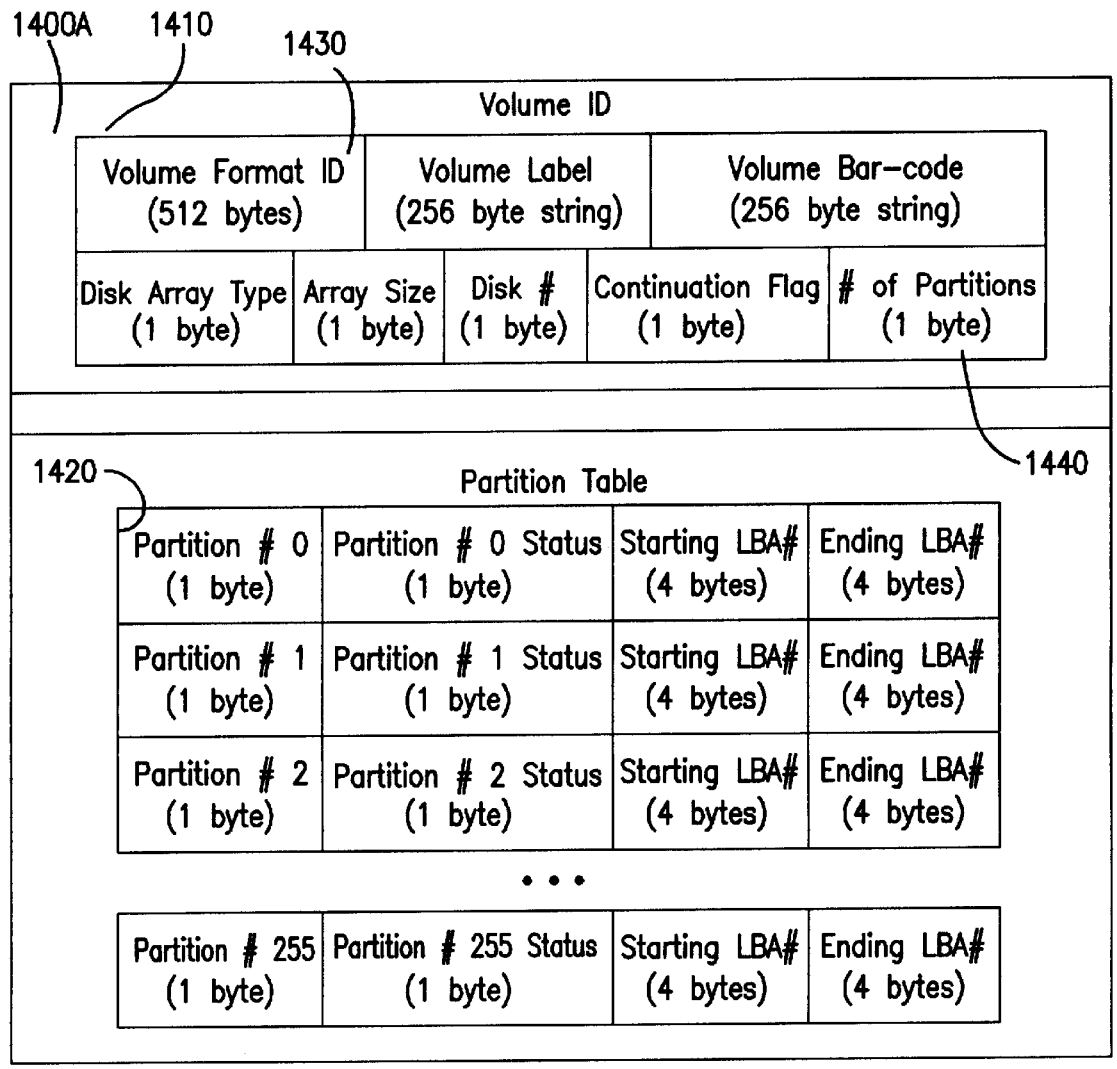
FIG. 14A is a diagrammatic view of a volume header frame recorded on a disk usable by the storage system of FIG. 1.

Frames containing user data or ECC are not the only types of frames which can be recorded on disk 24. FIG. 14A shows two other types of frames that are preferably recorded at the beginning of disk 24. The first non-user data type of frame is volume header frame 1400A. The second non-user data type of frame are directory frames which comprise a special block known as directory 1400. The remainder of disk 24 (as depicted by shading in FIG. 14) is available for user data frames.

The volume header frame 1400A is recorded at logical block address #0 (i.e., LBA #0) on disk 24. The volume header frame 1400A includes control information related to the organization of data stored on disk 24. As shown in FIG. 14A, volume header frame 1400A has two sections: volume identification section 1410 and partition table 1420.

The volume identification section 1410 includes information describing the data format on disk 24 and the relationship of this disk to others with which it might be a set. Fields included in volume identification section 1410 include volume format ID field 1430 and other fields such as a volume label field; a volume barcode field; a disk array type field; an array size field; a disk number field; a continuation flag; and a number of partitions field 1440.

The size of partition table 1420 (see FIG. 14A) is specified by number of partitions field 1440 in volume identification section 1410. The partition table 1420 lists the number of active partitions on disk 24, and for each partition the status as well as the starting and ending logical block addresses (LBAs). In diagrammatic form, FIG. 14A shows each row of partition table 1420 as being associated with a partition. In the illustrated embodiments, there may be as many as 256 partitions.

As mentioned above, directory 1400B (see FIG. 14) is a special block of frames on disk 24 which follows the volume header frame 1400A. Directory 1400B contains a frame index. The frame index is comprised of frame index entries, the format of one such frame index entry 1300 being shown in FIG. 13. The purpose of directory 1400B is to facilitate location by tape drive emulator 30 of the logical block addresses (LBAs) of specific data items (e.g., by logical block number or file number) stored in the frame structure on the data area of the disk.

There is one frame index entry 1300 generated for each frame 300 (see FIG. 3) recorded on disk 24. The frame index entries are packed into directory frames (by buffer block packer and unpacker unit 163) and recorded on the disk 24. In the case of a frame for a 512 byte sector (having 19,420 bytes of data area), 1294 frame index entries are stored in each directory frame. Directory 1400B is thus comprised of enough frames to store all frame index entries. Directory 1400B is recorded at a specific location on disk 24, i.e., at LBA #40 in the illustrated embodiment.

Figure 13:
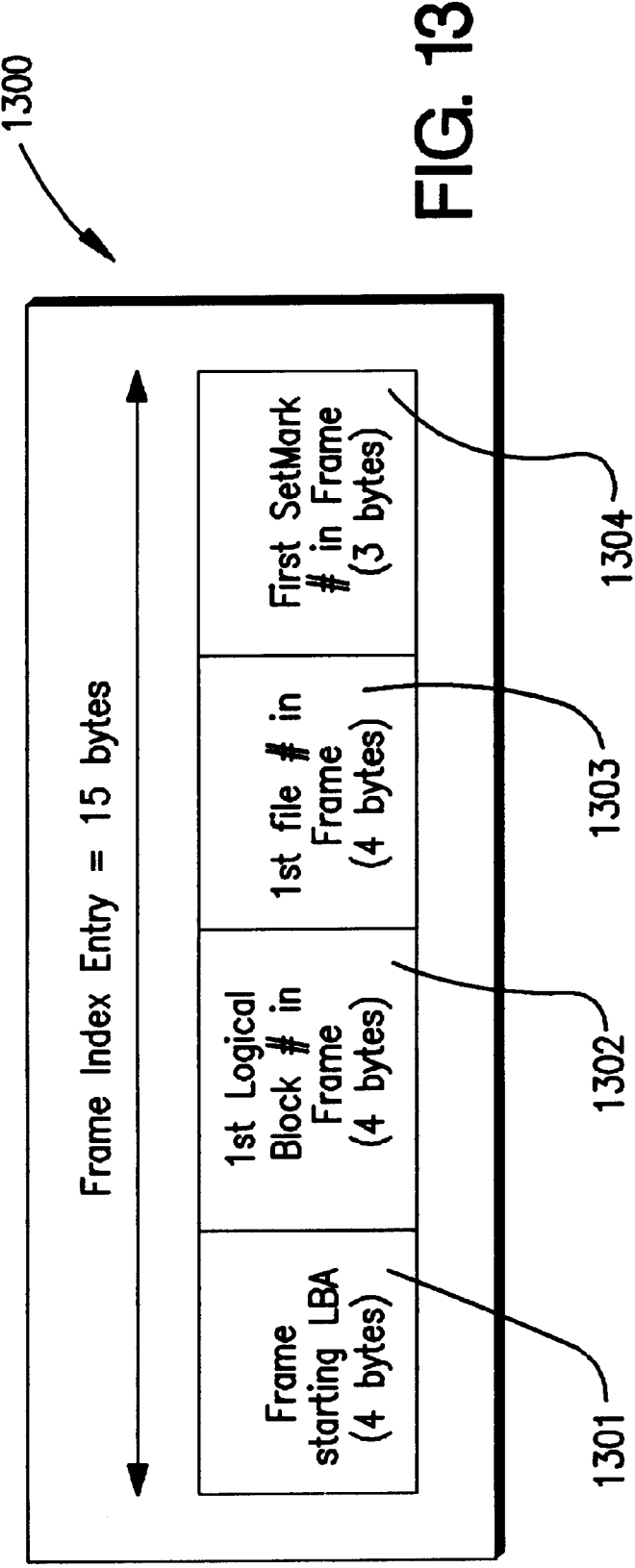
FIG. 13 is a diagrammatic view showing contents of a frame index entry in a directory recorded on a disk by the storage system of FIG. 1.

FIG. 13 shows the format of frame index entry 1300. Each frame index entry 1300 has fifteen bytes. Frame index entry 1300 has a first field 1301 which contains four bytes of a frame starting LBA; a second field 1302 which contains the first logical block number in the frame (four bytes); a third frame field 1303 which contains the first file number in the frame (four bytes); and, a fourth frame field 1304 which contains the first setmark number in the frame (three bytes).

As one example, assume that a removable disk drive has a disk with a storage capacity of 20GB. Such a disk has a capacity for 976,562 frames. The corresponding 976,562 frame index entries requires that directory 1400 have seven hundred fifty five frames.

Figure 15:
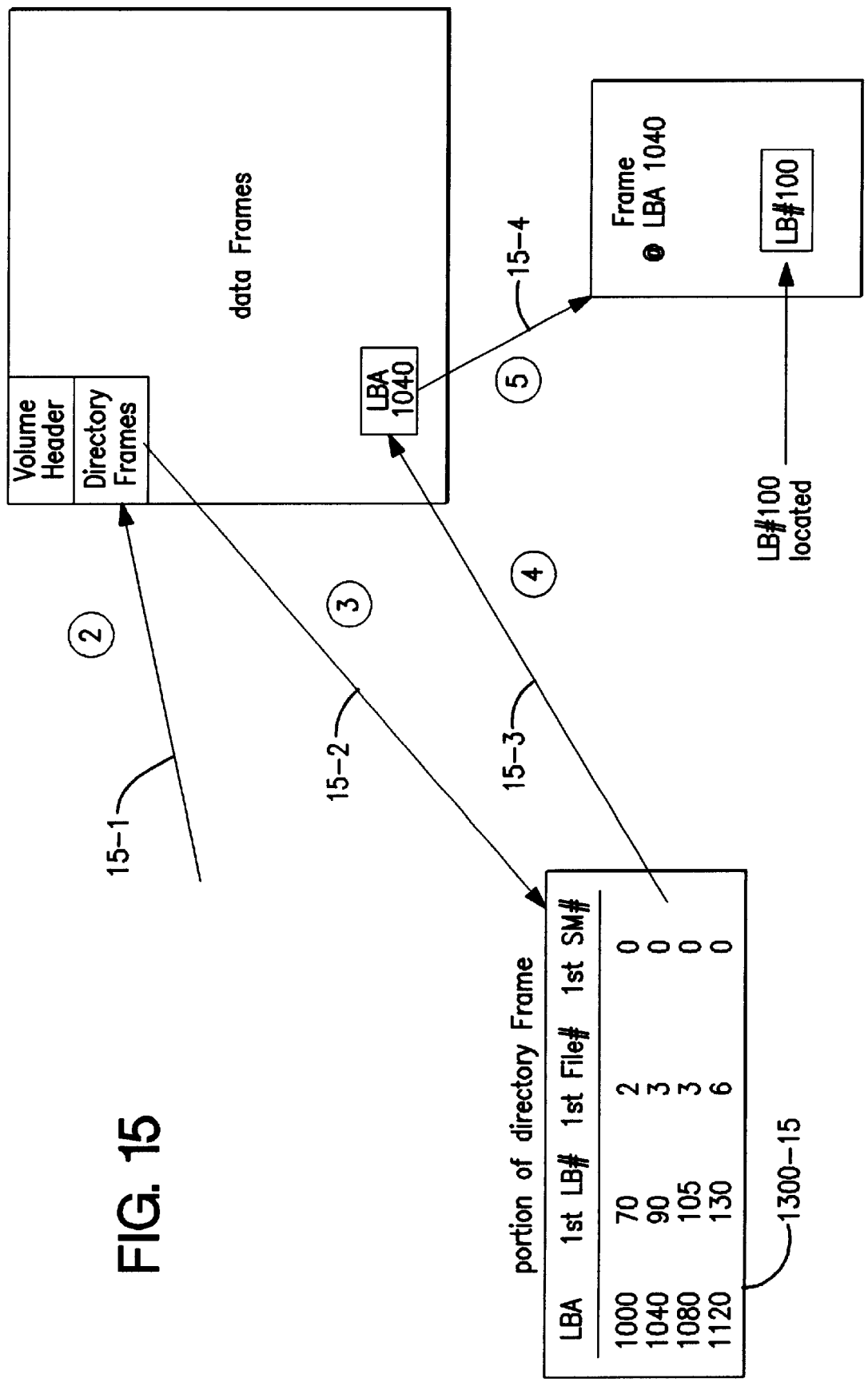
FIG. 15 is a diagrammatic view showing an example of usage of a directory recorded on a disk handled by the storage system of FIG. 1.

FIG. 15 provides an illustration of usage of directory 1400B. It is assumed that host computer 40 issues a command to locate logical block #100 (LB #100). Upon receipt of such a command, tape drive emulator 30 sends a command to disk drive 22 (depicted by arrow 15-1) so that disk drive 22 reads directory 1400B of the disk to identify the directory frame which contains a frame index entry for logical block LB #100. Upon receipt of the directory frame (depicted by arrow 15-2), a portion of which is shown as 1300-15 in FIG. 15, tape drive emulator 30 locates the frame index entry which indicates in which disk LBA the requested logical block (i.e., logical block LB #100) resides. As shown in FIG. 15, a frame recorded at disk LBA 1040 begins with logical block 90 and a frame recorded at disk LBA 1080 begins with logical block 105, meaning that the frame recorded at disk LBA 1040 has logical block #100 stored thereon. In FIG. 15, arrow 15-3 points to the frame recorded at disk LBA 1040 which has the sought logical block #100. Then, tape drive emulator 30 issues a command to disk drive 22 for disk drive 22 to read the frame which includes logical block #100, i.e., the frame beginning at LBA 1040, as indicated by arrow 15-4. In the process of reading the frame, logical block #100 is read and provided to host computer 40.

Thus, each frame index entry 1300 contains the first logical block number, the first file number, and the first set mark number stored in each frame. A specific item is located by searching for the highest entry below (or equal to ) the desired item. The associated logical block address (LBA) points to the frame where the beginning of the desired data item is located.

The present invention thus applies an additional logical format to allow a disk to be operated as a "virtual" tape backup device. In addition, the present invention adds additional ECC, herein known as frame ECC, to the embedded format of removable disk drive 22 to enhance its data reliability. The present invention increases data reliability of a removable disk drive by about ten orders of magnitude.

The tape drive emulator 30 of the present invention emulates the operation of a tape drive using a removable disk medium. The tape drive emulator 30 is advantageous since software written for data backup applications presently assumes that the data is recorded to a tape drive. Tape drives, being sequential in nature, use a different set of commands and functions to write, read, and locate data than do disk drives. One of those features, which is included in the present invention, but not present in disk drives, is data delineators or delimiters such as file marks and set marks, as well as the ability to search for data based on delineator or delimiter types (logical blocks, file number, setmark number, etc.). The directory 1400 of the present invention particularly facilitates such searching and location.

The present invention is equally applied to magnetic disk drives and optical drives.

Thus, the disk media employed by the present invention is physically identical to media used in a generic or standard removable disk drive (herein referenced as the "standard drive"). When a standard drive becomes combined with the tape drive emulator 30 of the present invention, the disk drive becomes an "enhanced" drive. In this respect, the media employed by the present invention has a frame-based format enhancement which is described in detail above.

Because the disks with frame-based format enhancement used with the present invention are physically identical to other disks and differ only in format, the present invention also provides a way of avoiding confusion which might otherwise occur.

In the above regard, the frame-based format enhancement used with the present invention does not violate the format of a standard drive in any respect. Such being the case, a standard drive must be able to recognize the presence of the frame-based format enhancement, and preferably should do so without requiring any special circuits or hardware. Otherwise, the standard drive might inadvertently corrupt the data recorded on a disk having the frame-based format enhancement. Conversely, an enhanced drive of the present invention should be able to detect the difference between the standard format and the frame-based format enhancement. Otherwise the enhanced drive of the present invention could misinterpret the data on a standard disk.

The corruption and misinterpretation concerns mentioned above are overcome in the present invention by pre-formatting the standard format media (which itself has already been pre-formatted) with a secondary format. In particular, a secondary formatting operation is employed to make the disk compatible with the frame-based format enhancement of the present invention. The secondary formatting operation records the volume header frame 1400A and the directory 1400B on the disk in the manner shown in FIG. 14. The volume format ID field 1430 of the volume header frame 1400A is used to discriminate between a standard format disk and a disk having the secondary formatting, i.e., the frame-based format enhancement of the present invention.

In the above regard, volume format ID field 1430 of volume identification section 1410 is a unique 512 byte sequence which occupies the first sector address on disk 24 (typically LBA #0). When disk 24 is inserted into either a standard drive or an enhanced drive, the drive reads the first sector [e.g., at LBA(0)] and analyzes the contents of the first sector. If the unique pattern of the volume format ID field 1430 is found, the drive knows that disk 24 has the frame-based format enhancement of the present invention. If the unique pattern of volume format ID field 1430 is not found, the drive realizes that the disk is but a standard disk without the frame-based format enhancement of the present invention.

As explained in more detail with reference to FIG. 18B, when a standard drive detects disk 24 having the frame-based format enhancement of the present invention, the standard drive rejects disk 24 as being incompatible. Similarly, when an enhanced drive does not detect the volume format ID field 1430 (i.e., the frame-based format enhancement of the present invention), the media will be rejected as incompatible (see FIG. 18B). Thus, both the standard drive and the enhanced drive can detect format type using only the circuitry of the standard drive (e.g., no new circuitry is required).

As indicated above, the present invention has the secondary formatting operation which renders a disk recognizable as suitable for use with the frame-based format enhancement of the present invention. Steps involved in the secondary formatting operation are hereinafter described in connection with FIG. 16. Before explaining the steps of the secondary formatting operation, however, brief discussion is provided regarding the resources for implementation of secondary formatting operation.

Figure 17A:
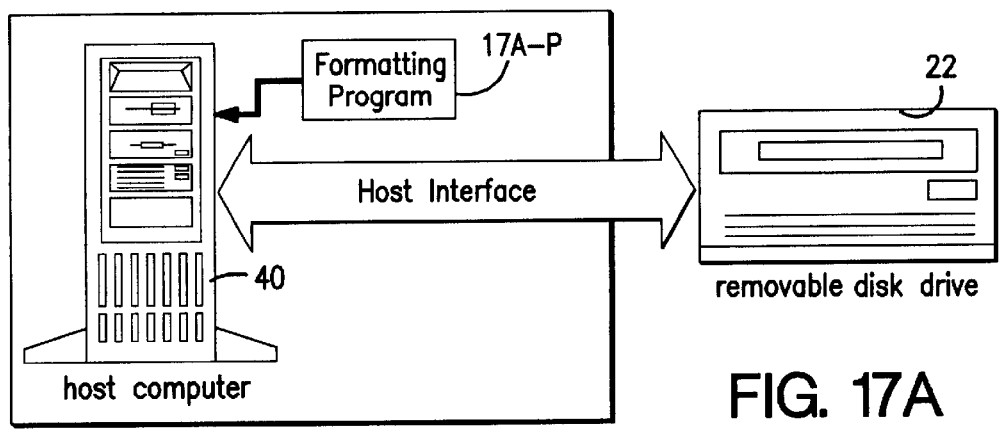
FIGS. 17A, FIG. 17B, and FIG. 17C are diagrammatic views showing respective resource configurations for performing the secondary formatting operation FIG. 16.
Figure 17B:
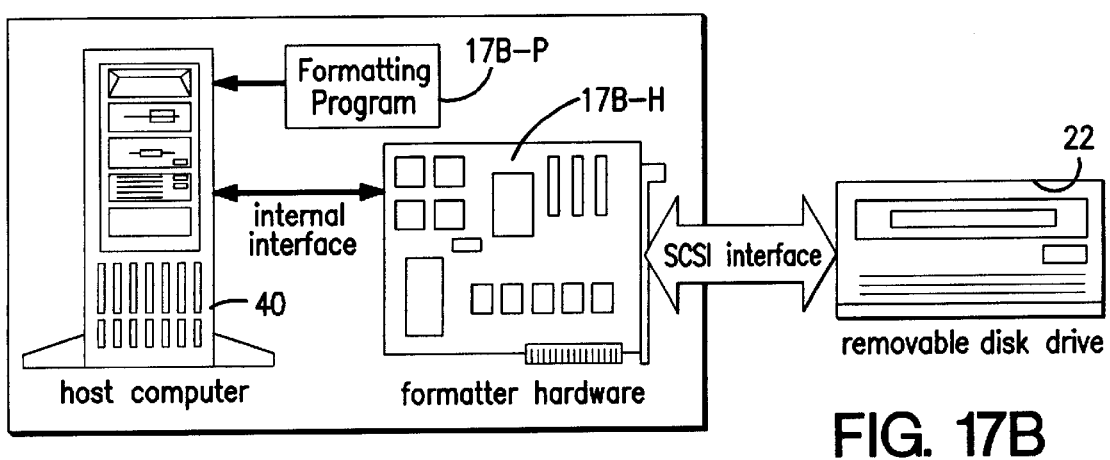
Figure 17C:
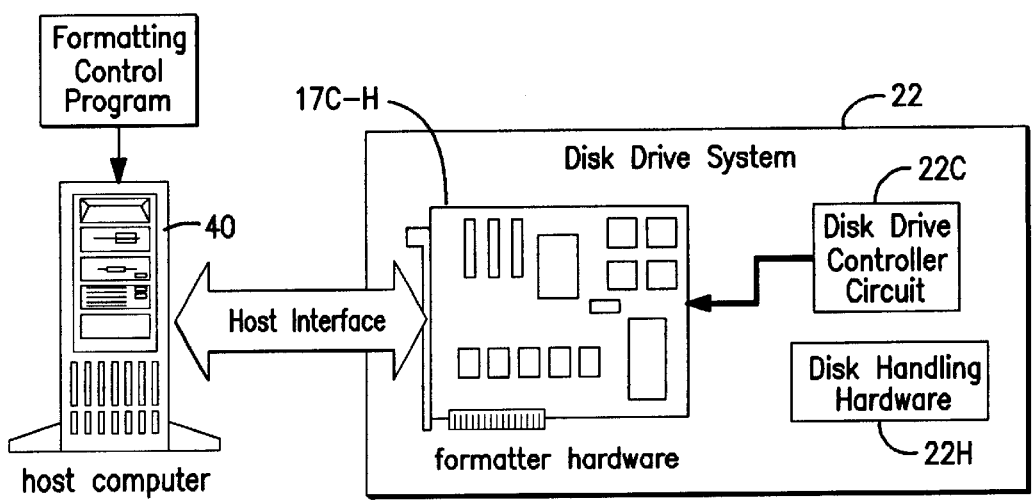

FIG. 17A, FIG. 17B, and FIG. 17C show several resource configurations for performing the secondary formatting operation of the present invention. In the mode of FIG. 17A, the secondary formatting operation is primarily performed by a software program 17A-P executed by a CPU in host computer 40. In the mode of FIG. 17B, the secondary formatting operation is performed in part by software executed by the CPU of host computer 40 (indicated as formatting program 17B-P in FIG. 17B) and in part by circuitry (represented by formatter hardware 17B-H in FIG. 17B) which resides in host computer 40 (e.g., on a printed circuit board). In the mode of FIG. 17A, the secondary formatting operation is primarily performed by circuitry (represented by formatter hardware 17C-H in FIG. 17C) which resides in removable disk drive 22. It will be apparent that the last mode is akin to the embodiment of FIG. 1A. In fact, formatter hardware 17C-H in FIG. 17C can be on the same circuit board as tape drive emulator 30. Moreover, the formatting functions performed by formatter hardware 17C-H in FIG. 17C can be performed by components of tape drive emulator 30 (see FIG. 2) which are also involved in the tape drive emulation (e.g., controller 160).

The term "formatter controller" herein generically and collectively represents whichever resource(s) perform the secondary formatting operation of the present invention, whether such resource entities be those of FIG. 17A, 17B, or 17C for example. In other words, "formatter controller" can be construed to encompass, among other things, formatting program 17A-P, formatting program 17B-P working in conjunction with formatter hardware 18B-H in host computer 40; or formatter hardware 17C-H in removable disk drive 22.

Figure 16:
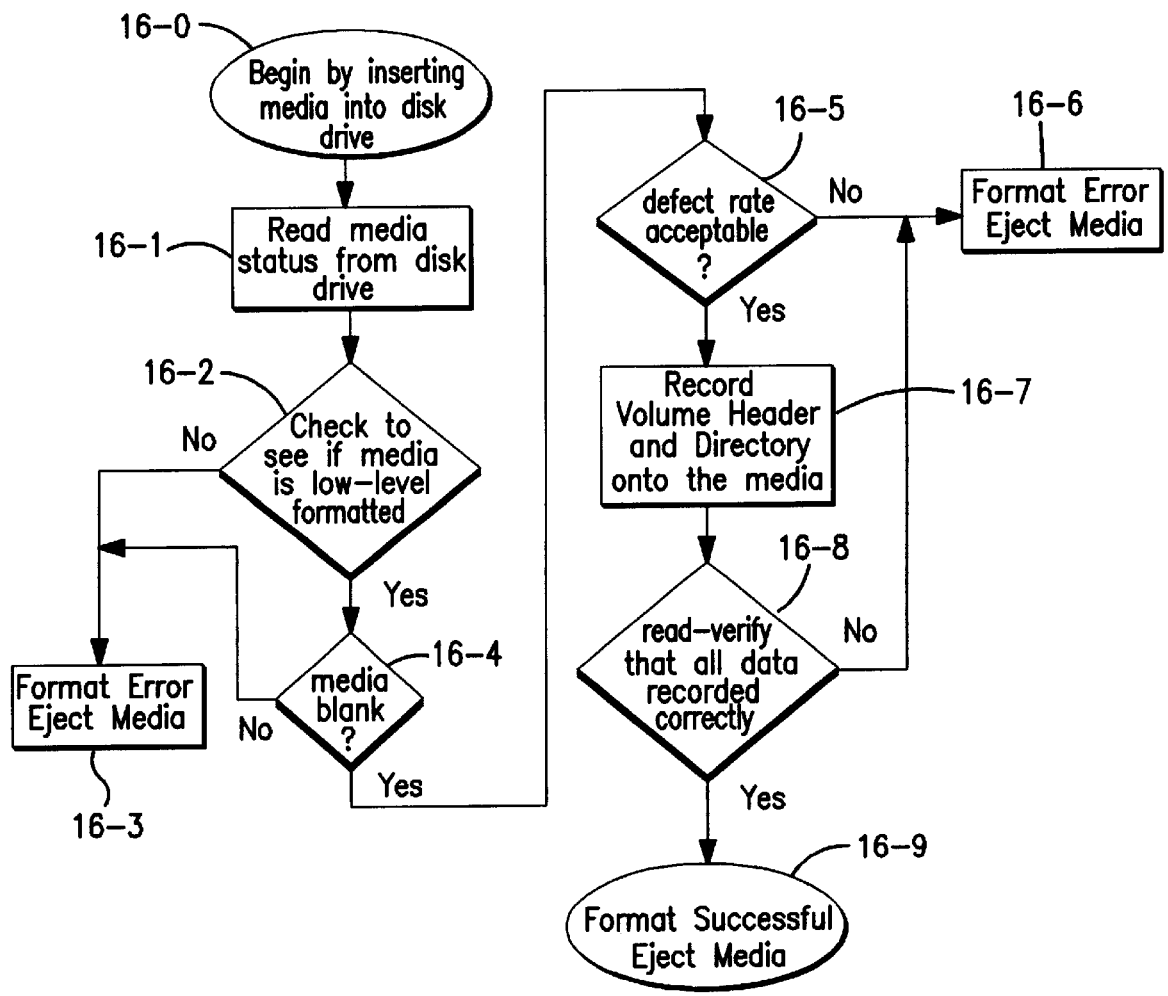
FIG. 16 is a flowchart showing basic steps performed in connection with a secondary formatting operation of the present invention.

Steps performed by the formatter controller of the present invention in conjunction with secondary formatting operation are depicted in FIG. 16. Step 16-0 represents initiation of secondary formatting operation, which beings with insertion of the disk into the disk drive. At step 16-1, formatter controller reads the media status from the disk drive. Media status is information extracted from a primary format header on the disk, which primary format header includes information such as, for example, whether or not the media is formatted, the defect count of the media, whether the media is write protected, etc. Then at step 16-2 the formatter controller determines from the media status read at step 16-1 whether the media has its low-level format (i.e., the typical formatting of the disk into sectors, etc., which precedes the secondary formatting of the present invention). If the disk does not have low-level formatting, formatter controller causes the disk to be ejected as indicated by step 16-3. If it is determined at step 16-4 that the disk is formatted but not blank (known from the media status read at step 16-1), formatter controller likewise causes the disk to be ejected as indicated by step 16-3. A blank disk is one which is formatted but otherwise has no data recorded thereon.

Assuming the disk does have low-level formatting and is blank, at step 16-5 formatter controller determines from the media status read at step 16-1 whether the defect rate of the disk is acceptable. The determination of defect rate is in accordance with the low-level formatting, e.g., the number and distribution of defect sectors as noted during the low-level formatting. If the defect rate is unacceptable, formatter controller causes the disk to be ejected as indicated by step 16-6.

If the disk has low-level formatting, is not blank, and has an acceptable defect rate, at step 16-7 the formatter controller conducts a volume header and directory recording operation. In the volume header and directory recording operation of step 16-7, the formatter controller records both the volume header frame 1400A and directory 1400B on the disk (see FIG. 14). Substeps of the volume header and directory record operation of step 16-7 are shown FIG. 16A.

After performance of the volume header and directory recording operation of step 16-7, formatter controller conducts step 16-8 to ensure that step 16-7 was performed correctly. In this regard, at step 16-8 formatter controller reads back the volume header frame 1400A and directory 1400B recorded at step 16-7, and compares what is read with what stored information indicative of what formatter controller intended to record. If the verification step 16-8 indicates a discrepancy, formatter controller causes the disk to be ejected as indicated by step 16-6. Otherwise, the secondary formatting operation is deemed successful and is terminated as indicated by step 16-9.

Figures 16A, 16B, 16C:
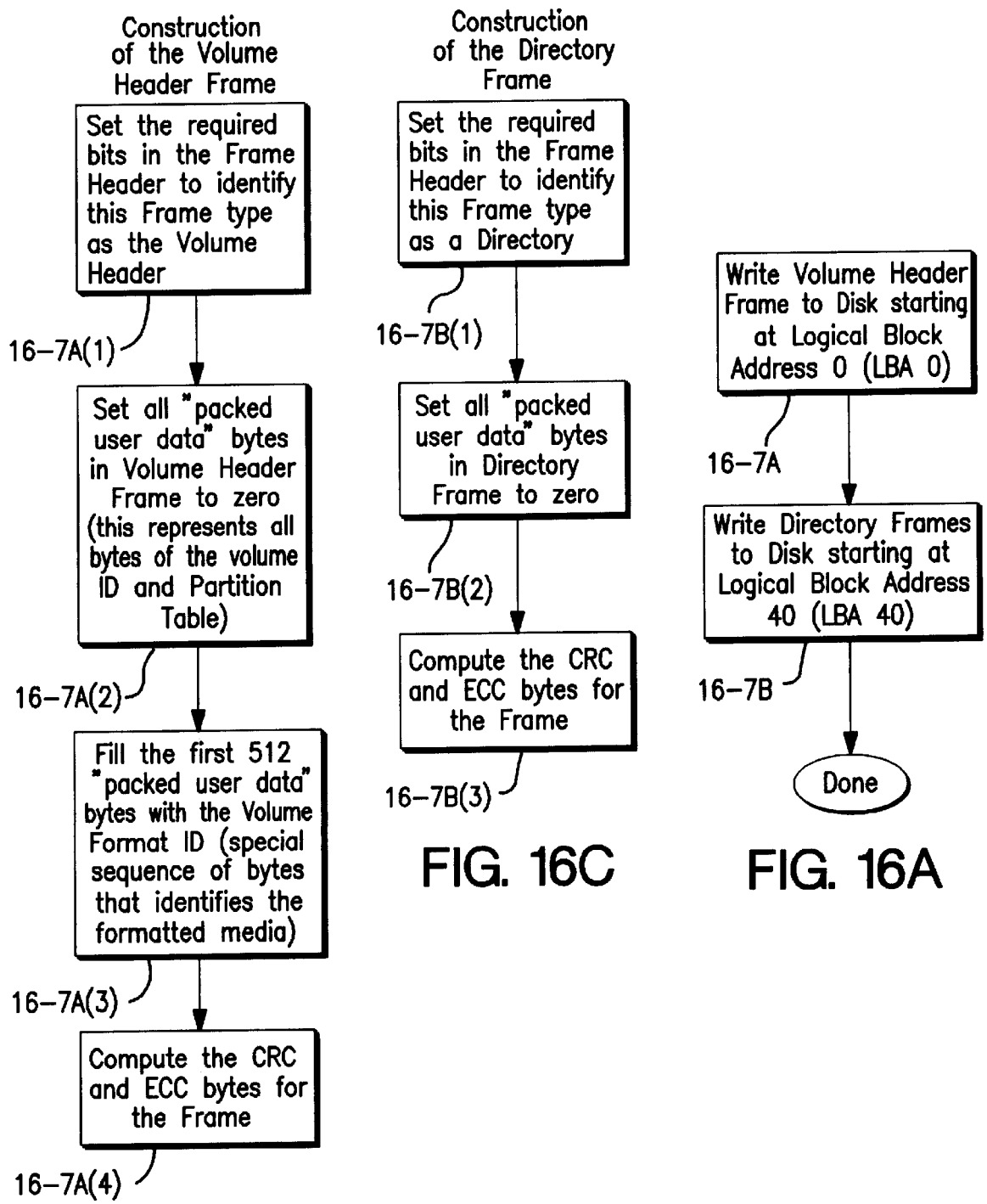
FIGS. 16A, 16B, and 16C are flowcharts showing basic sub-steps of the secondary formatting operation of FIG. 16.

FIG. 16A shows that the volume header and directory recording operation of step 16-7 involves writing the volume header frame 1400A to disk starting at logical block address 0 (LBA 0) [step 16-7A]. The writing of the volume header frame 1400A is followed by writing to disk of the directory 1400B [step 16-7B]. The writing of the directory 1400B begins at logical address block 40 (LBA 40) in the illustrated embodiment.

Substeps involved in writing the volume header frame 1400A to disk [i.e., substeps of step 16-7A] are shown in FIG. 16B. At substep 16-7A(1) the required unique pattern of bits which identify the frame-based enhanced format of the disk is prepared for ultimate writing to volume format ID field 1430 (see FIG. 14A). Next, all packed user data bytes in the volume header frame 1400A are set to zero. In other words, all bytes in the volume identification section 1410 and partition table 1420 are cleared [substep 16- 7A(2)]. Thereafter, the volume format ID field 1430, i.e., the first 512 packed user data bytes, are filled with the unique pattern prepared at substep 16-7A(1), i.e., the volume format ID field 1430 is recorded on the disk. Lastly, at substep 16-7A(4) the CRC and EEC bytes are computed for the volume header frame 1400A and are recorded in the frame on the disk.

Substeps involved in writing the directory 1400B to disk [i.e., substeps of step 16-7B] are shown in FIG. 16C, and are executed for each of a potential plural number of directory frames included in directory 1400B. At substep 16-7B(1) the formatter controller sets the required bits in the frame header which indicates that the frame is a directory frame. Then, at substep 16-7B(2) the packed user data bytes in the directory frame are set to zero (e.g., cleared). At substep 16-7B(3) the formatter controller computes the CRC and EEC bytes for the directory frame.

Figure 18A:
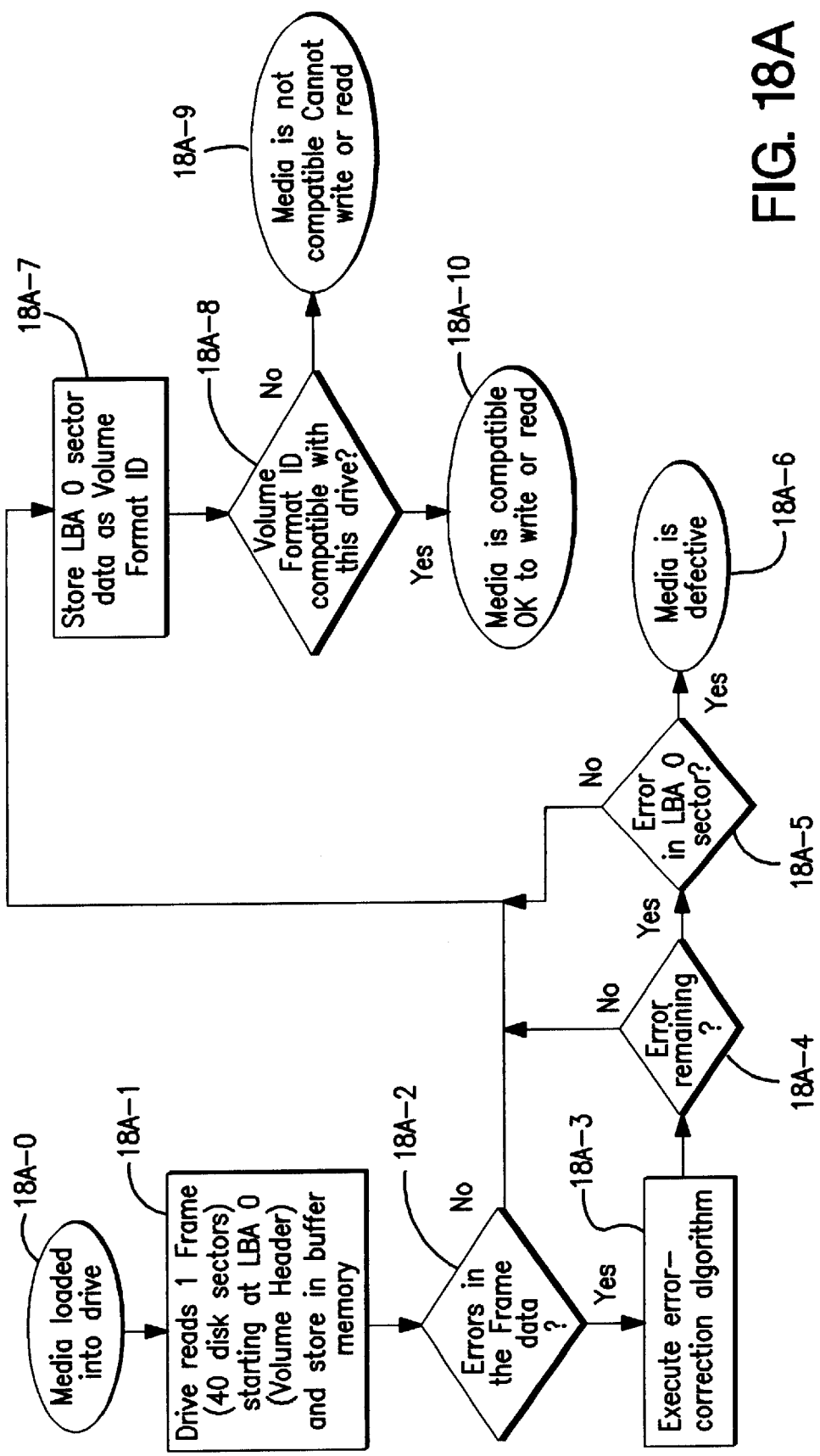
FIG. 18A is a flowchart showing basic steps executed by an enhanced drive of the present invention for verifying compatibility of media type.

FIG. 18A shows basic steps executed by an enhanced drive of the present invention for verifying compatibility of media type. Step 18A-0 represents the media (i.e., a disk) being inserted into the enhanced drive. After insertion, the enhanced drive reads the volume header frame 1400A which, in the illustrated embodiment, is the first frame on the disk (i.e., the first 40 sectors) and which begins at LBA #0. Step 18A-1 also represents the volume header frame 1400A being stored in memory, e.g., in buffer 172 (see FIG. 2).

At step 18A-2, controller 160 of the enhanced drive, in conjunction with ECC-2 coder and decoder 166, determines whether errors exist in the volume header frame 1400A. If an error exists, the enhanced drive attempts (at 18A-3) to correct the errors using its error correction algorithm. If it is determined at 18A-4 that errors remain after attempted correction, a check is made at 18A-5 whether an error resides in the LBA #0 sector of volume header frame 1400A. If an error does reside in LBA #0 sector of volume header frame 1400A, at 18A-6 the disk is declared to be defective.

If there is no error in volume header frame 1400A, or if the LBA #0 sector is recoverable, at 18A-7 the LBA #0 sector data is stored at the volume format identification. With the format type thus obtained from the tape, at 18A-8 the volume format identification obtained from the volume identification section 1410 is compared with the predetermined unique pattern indicative of a frame-based enhanced disk. If the volume format identification is not the same as the predetermined unique pattern indicative of a frame-based enhanced disk, at 18A-9 the disk is declared as incompatible with the enhanced drive. If the volume format identification is the same as the predetermined unique pattern indicative of a frame-based enhanced disk, at 18A-10 the disk is declared as compatible with the enhanced drive, thereby enabling subsequent reading or writing operations with respect to the confirmed enhanced format disk.

Figure 18B:
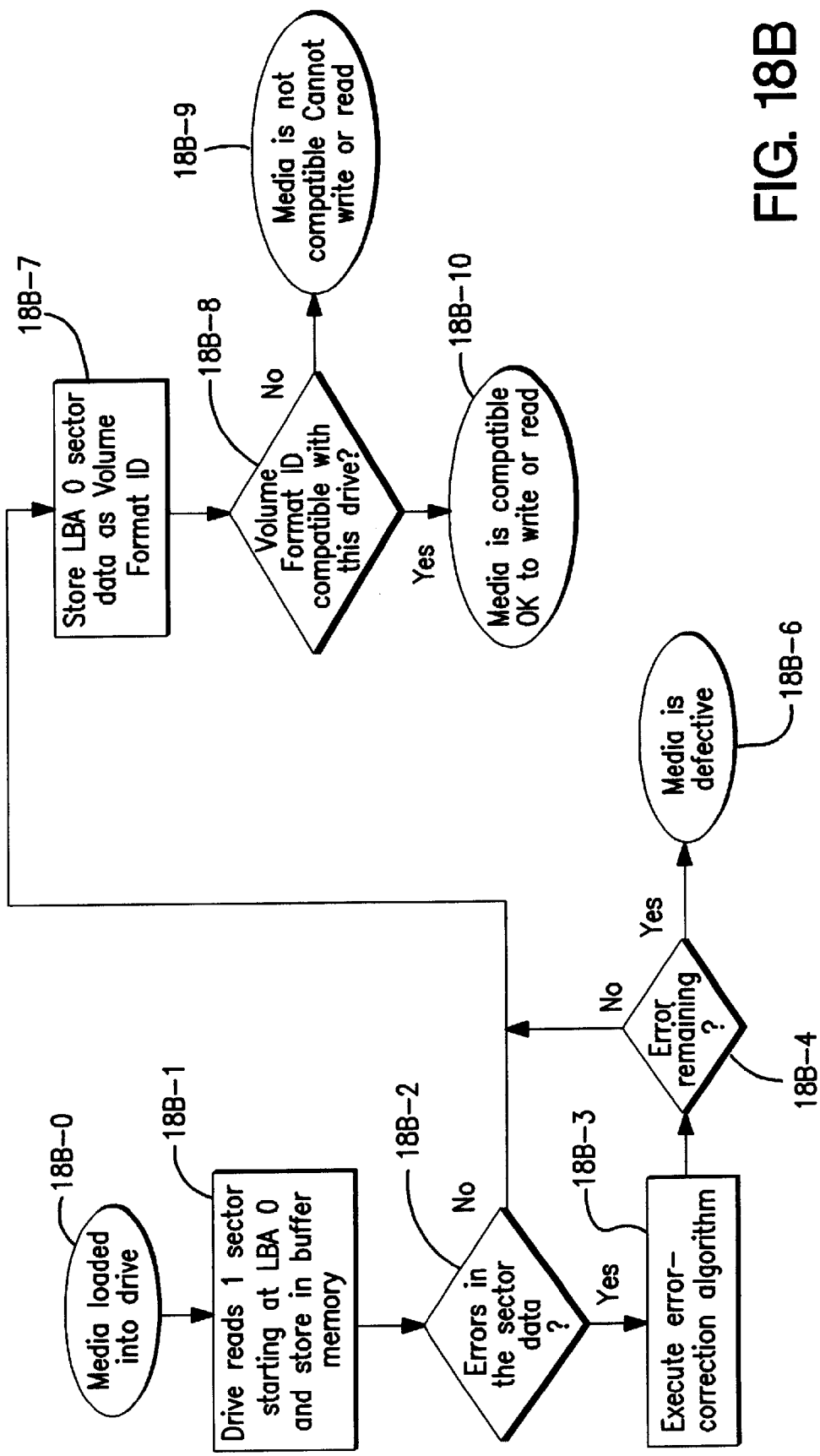
FIG. 18B is a flowchart showing basic steps executed by an standard drive for verifying compatibility of media type.

FIG. 18B shows basic steps executed by an standard drive for verifying compatibility of media type. The steps of FIG. 18B are essentially identical to those of FIG. 18A, with the exception that there is no step in FIG. 18B corresponding to 18A-5. In essence, the standard drive also attempts to read the LBA #0 sector as the volume format identification, and (at 18B-8) compares the LBA #0 contents to the predetermined unique pattern indicative of a frame-based enhanced disk. Depending on the comparison, the disk is either declared as compatible (step 18B-10) or incompatible (step 18B-9) with the standard drive.

Thus, the secondary formatting operation of the present invention precludes problems that otherwise might occur were a standard drive to attempt to read a format-enhanced disk of the present invention, or the enhanced drive of the invention to attempt to read a non-enhanced disk.

While the invention has been described in connection with what is presently considered to be the most practical and preferred embodiments and modes, it is to be understood that the invention is not to be so limited, but on the contrary, is intended to cover various modifications and equivalent arrangements included within the spirit and scope of the appended claims.

What is claimed is:

1. A data storage system which connects to a host computer for performing one of a data backup operation and data restore operation, the data storage system comprising:
    a disk drive which transduces information in a sector format with respect to a rotating disk,
    a tape drive emulator connected between the disk drive and the host computer, the tape drive emulator interfacing with the host computer using a set of commands applicable to a tape drive, the tape drive emulator communicating data to and from the disk drive whereby the data is transduced relative to the disk in the sector format,
    wherein the tape drive emulator generates a set of data, the set of data being recorded in a predetermined plural number of sectors on the disk, the set of data having error correction bytes generated over the set, the error correction bytes being sufficient to recover a sector of the disk not readable by the disk drive.

2. The system of claim 1, wherein the predetermined plural number of sectors is forty.

3. The system of claim 1, wherein error correction information is stored on two of the predetermined plural number of sectors.

4. The system of claim 1, wherein the predetermined plural number of sectors is sixteen hundred.

5. The system of claim 1, wherein error correction information is stored on eighty of the predetermined plural number of sectors.

6. The system of claim 1, wherein user data included in a set corresponds to a buffer block of data generated by the tape drive.

7. The system of claim 1, wherein the tape drive emulator generates plural frames of data, each of the frames of data being recording on the predetermined plural number of sectors on the disk, each frame having the error correction bytes generated thereover, at least some of the frames serving as directory frames, the directory frames having stored therein references to storage locations on the disk of data delineators.

8. The system of claim 7, wherein the data delineators include one of logical block numbers, file marks, and set marks.

9. The system of claim 1, wherein the disk is a rotating magnetic disk.

10. The system of claim 1, wherein the disk is a removable disk.

11. A data storage system which connects to a host computer for performing one of a data backup operation and data restore operation, the data storage system comprising:
    a disk drive which transduces information on a rotating disk,
    a tape drive emulator connected between the disk drive and the host computer, the tape drive emulator comprising:
        a compression engine which compresses logical blocks obtained from the host computer;
        a packer unit which packs compressed logical blocks;
        an error correction encoder which generates error correction bytes over the logical blocks; and
    wherein the compressed logical blocks and error correction bytes are transmitted as a set to the disk drive, the set being recordable in a predetermined plural number of sectors on the disk drive.

12. The system of claim 11, wherein the tape drive emulator further comprises a header generator which generates header bytes for inclusion in a frame of the set, the header bytes including frame identifying information.

13. The system of claim 11, wherein the predetermined plural number of sectors is forty.

14. The system of claim 11, wherein error correction information is stored on two of the predetermined plural number of sectors.

15. The system of claim 11, wherein the predetermined plural number of sectors is sixteen hundred.

16. The system of claim 11, wherein error correction information is stored on eighty of the predetermined plural number of sectors.

17. The system of claim 11, wherein a set is a frame, and wherein user data included in a frame corresponds to a buffer block of data generated by the tape drive.

18. The system of claim 11, wherein the error correction bytes are sufficient to recover a sector of the disk not readable by the disk drive.

19. The system of claim 11, wherein the disk is a rotating magnetic disk.

20. The system of claim 11, wherein the disk is a removable disk.

21. The apparatus of claim 11, wherein the error correction bytes are sufficient to recover a sector of the disk not readable by the disk drive.

22. A method of storing computer data on a rotating magnetic disk, the method comprising:
    using a tape drive emulator connected between a disk drive and a host computer to interface with the host computer using a set of commands applicable to a tape drive,
    communicating data from the tape drive emulator to and from the disk drive whereby the data is transduced relative to the disk in a sector format,
    generating with the tape drive emulator a set of data, the set of data being recorded in a predetermined plural number of sectors on the disk, the set of data having error correction bytes generated over the set, the error correction bytes being sufficient to recover a sector of the disk not readable by the disk drive.

23. The method of claim 22, wherein the set includes a frame, each frame having the error correction bytes generated thereover, and further comprising generating a frame header and including the frame header in the set, the frame header being covered by the error correction bytes.

24. The method of claim 23, further comprising generating a CRC bytes for the frame and including the CRC bytes in the frame, the error correction bytes covering the CRC bytes.

25. The method of claim 22, further comprising compressing the user data prior to forming the set.

26. The method of claim 22, wherein the predetermined plural number of sectors is forty.

27. The method of claim 22, wherein error correction information is stored on two of the predetermined plural number of sectors.

28. The method of claim 22, wherein the predetermined plural number of sectors is sixteen hundred.

29. The method of claim 22, wherein error correction information is stored on eighty of the predetermined plural number of sectors.

30. The method of claim 22, wherein user data included in a set corresponds to a buffer block of data generated by the tape drive.

31. The method of claim 22, further comprising the tape drive emulator generating plural frames of data, each of the frames of data being recording on the predetermined plural number of sectors on the disk, each frame having the error correction bytes generated thereover, at least some of the frames serving as directory frames, the directory frames having stored therein references to storage locations on the disk of data delineators.

32. The method of claim 31, wherein the data delineators include one of logical block numbers, file marks, and set marks.

33. The method of claim 22, wherein the disk is a rotating magnetic disk.

34. The method of claim 22, wherein the disk is a removable disk.

35. A method of storing computer data on a rotating magnetic disk, the method comprising:
    using a tape drive emulator connected between a disk drive and a host computer to interface with the host computer using a set of commands applicable to a tape drive,
    communicating data from the tape drive emulator to and from the disk drive whereby the data is transduced relative to the disk in a sector format,
    recovering with the tape drive emulator a set of data, the set of data being recorded in a predetermined plural number of sectors on the disk, the set of data having error correction bytes generated over the set, the error correction bytes being sufficient to recover a sector of the disk not readable by the disk drive.

36. The method of claim 35, wherein the predetermined plural number of sectors is forty.

37. The method of claim 35, wherein error correction information is stored on two of the predetermined plural number of sectors.

38. The method of claim 35, wherein the predetermined plural number of sectors is sixteen hundred.

39. The method of claim 35, wherein error correction information is stored on eighty of the predetermined plural number of sectors.

40. The method of claim 35, further comprising the tape drive emulator generating plural frames of data, each of the frames of data being recording on the predetermined plural number of sectors on the disk, each frame having the error correction bytes generated thereover, at least some of the frames serving as directory frames, the directory frames having stored therein references to storage locations on the disk of data delineators.

41. The method of claim 40, wherein the data delineators include one of logical block numbers, file marks, and set marks.

42. The method of claim 35, wherein the disk is a rotating magnetic disk.

43. The method of claim 35, wherein the disk is a removable disk.

44. A rotating information storage media comprising: a disk formatted with sectors, a set of data being recorded over a predetermined plural number of the sectors, the set of data having error correction bytes generated over the set of data, the error correction bytes being sufficient to recover a sector of the disk not readable by a disk drive.

45. The media of claim 44, wherein the predetermined plural number of sectors is forty.

46. The media of claim 44, wherein the error correction information is stored on two of the predetermined plural number of sectors.

47. The media of claim 44, wherein the predetermined plural number of sectors is sixteen hundred.

48. The media of claim 44, wherein the error correction information is stored on eighty of the predetermined plural number of sectors.

49. The media of claim 44, wherein the user data included in the set corresponds to a buffer block of data generated by the tape drive.

50. A tape drive emulator connected between a disk drive and a host computer which interfaces with said host computer using a set of commands applicable to a tape drive, the tape drive emulator generating a set of data for recordation in a predetermined plural number of sectors on a rotating information storage media, the set of data having error correction bytes generated over the set of data, the error correction bytes being sufficient to recover a sector of a disk not readable by the disk drive.

51. The tape drive emulator of claim 50, wherein the tape drive emulator generates plural frames of data, each of the frames of data being recorded on the predetermined plural number of sectors on the disk, each frame having the error correction bytes generated thereover, at least some of the frames serving as directory frames, the directory frames having stored therein references to storage locations on the disk of data delineators.

52. The tape drive emulator of claim 51, wherein the data delineators include one of logical block numbers, file marks, and set marks.

53. A method of formatting a rotating disk upon which information is recorded, the method comprising recording on the disk a format type identification, the format type identification being interpretable to indicate that the disk is compatible with transducing a multi-sectored set of data, the set of data being recordable or having been recorded in a predetermined plural number of sectors on the disk, the set of data having set error correction bytes generated over the set, the error correction bytes being sufficient to recover a sector of the disk not readable by a disk drive.

54. The method of claim 53, wherein the format type identification is recorded at a beginning logical block address of the disk.

55. The method of claim 53, further comprising recording on the disk the format type identification as part of a volume header frame.

56. The method of claim 55, further comprising recording a partition table as part of the volume header frame.

57. The method of claim 53, wherein the format type identification has a length of one disk sector.

58. The method of claim 53, further comprising recording on the disk at least one directory frame.

59. The method of claim 58, further comprising recording on the disk the at least one directory frame following recording of the format type identification.

60. The method of claim 59, wherein the predetermined location on the disk is the first logical block address of the disk.

61. The method of claim 59, wherein the predetermined unique pattern indicative of an enhanced format has a length of one disk sector.

62. A rotating information storage media having:
a first layer format whereby the media is formatted with sectors;
a format type identification type stored therein indicating that the media has a second layer format;
wherein according to the second layer format a multi-sectored set of data is recordable or has been recorded in a predetermined plural number of sectors on a disk, the set of data having error correction bytes generated over the set, the error correction bytes being sufficient to recover a sector of the disk not readable by the disk drive.

63. The media of claim 62, wherein the format type identification is recorded at a beginning logical block address of the media.

64. The media of claim 63, wherein the format type identification is recorded as part of a volume header frame.

65. The media of claim 64, wherein a partition table is recorded as part of the volume header frame.

66. The media of claim 63, wherein the format type identification has a length of one disk sector.

67. The media of claim 63, wherein the media also has at least one directory frame recorded thereon.

68. The media of claim 67, wherein the at least one directory frame follows recording of the format type identification.

69. A method of operating a disk drive, the method comprising:
reading a predetermined location on a disk to ascertain a format type identification of the disk;
comparing information obtained from the predetermined location with a predetermined unique pattern indicative of an enhanced format and, in accordance with the comparison; and
providing an indication whether the disk is compatible with transducing a multi-sectored set of data, the set of data being recordable or having been recorded in a predetermined plural number of sectors on the disk, the set of data having set error correction bytes generated over the set, the error correction bytes being sufficient to recover a sector of the disk not readable by the disk drive.

* * * * *